United States Patent [19]

Bales et al.

[11] Patent Number: 5,675,583
[45] Date of Patent: Oct. 7, 1997

[54] VARIABLE COMMUNICATION BANDWIDTH FOR CONFERENCE CALL INITIATION

[75] Inventors: Bruce Merrill Bales, Louisville; Stephen Max Thieler, Boulder, both of Colo.

[73] Assignee: Lucent Technologies Inc., Murray Hill, N.J.

[21] Appl. No.: 452,458

[22] Filed: May 26, 1995

[51] Int. Cl.$^6$ .................................................. H04M 3/56
[52] U.S. Cl. ........................ 370/261; 370/384; 370/468; 379/205
[58] Field of Search .................... 370/60, 60.1, 62, 370/68.1, 110.1, 95.1, 85.7, 468, 357, 377, 522, 524, 260, 261, 264, 384; 379/201.63, 202, 205, 210, 211, 212, 215, 58–60, 203, 204, 207; 348/14, 15, 16

[56] References Cited

U.S. PATENT DOCUMENTS

| | | | |
|---|---|---|---|
| 4,796,293 | 1/1989 | Blinken et al. | 379/202 |
| 5,182,750 | 1/1993 | Bales et al. | 379/269 |
| 5,182,751 | 1/1993 | Bales et al. | 370/110.1 |
| 5,195,086 | 3/1993 | Baumgartner et al. | 370/62 |
| 5,195,087 | 3/1993 | Bennett et al. | 370/62 |
| 5,297,193 | 3/1994 | Bouix et al. | 379/63 |
| 5,305,312 | 4/1994 | Fornek et al. | 370/62 |
| 5,371,534 | 12/1994 | Dagdeviren et al. | 348/14 |
| 5,377,186 | 12/1994 | Wegner et al. | 370/62 |
| 5,463,629 | 10/1995 | Ko | 370/110.1 |
| 5,544,237 | 8/1996 | Bales et al. | 379/202 |

OTHER PUBLICATIONS

International Telecommunication Union (ITU–T, Telecommunication Standardization Sector of ITU, H.320, (Mar. 1993), Recommendation H.320, pp. 1–12.

Primary Examiner—Douglas W. Olms
Assistant Examiner—Chau T. Nguyen
Attorney, Agent, or Firm—John C. Moran

[57] ABSTRACT

Establishing a multimedia telecommunication conference call with reduced bandwidth if not all participants are available to be part of the conference call by telecommunication terminals. When one telecommunication terminal is initiating a conference call, the initiating telecommunication terminal first establishes low speed data links with each of the other telecommunications terminals that are to be part of the conference. When all users of the other telecommunication terminals are ready for the conference, the other telecommunication terminals signal the initiating telecommunication terminal which then adds the necessary bandwidth to the conference call to establish the multimedia telecommunication conference call. Since the conference call is already set up, the initiating telecommunication terminal only has to add the necessary bandwidth to conference call. Each participant in the telecommunication conference call designates when they are ready to have the conference call start. In addition, each participant can choose not to take part in the conference call.

92 Claims, 18 Drawing Sheets

TRANS 300 (TRANSPORT MESSAGE)

TRANS_ACK 310 (TRANSPORT ACKNOWLEDGE)

TRANS_COM 320 (TRANSPORT COMPLETE MESSAGE)

TRANS_REJ 330 (TRANSPORT REJECT MESSAGE)

| CONFERENCE TABLE | | |
|---|---|---|
| ID | ADDRESS | STATE |
| 0 | 101* | JOIN |
| 1 | 104 | JOIN |
| 2 | 106 | JOIN |

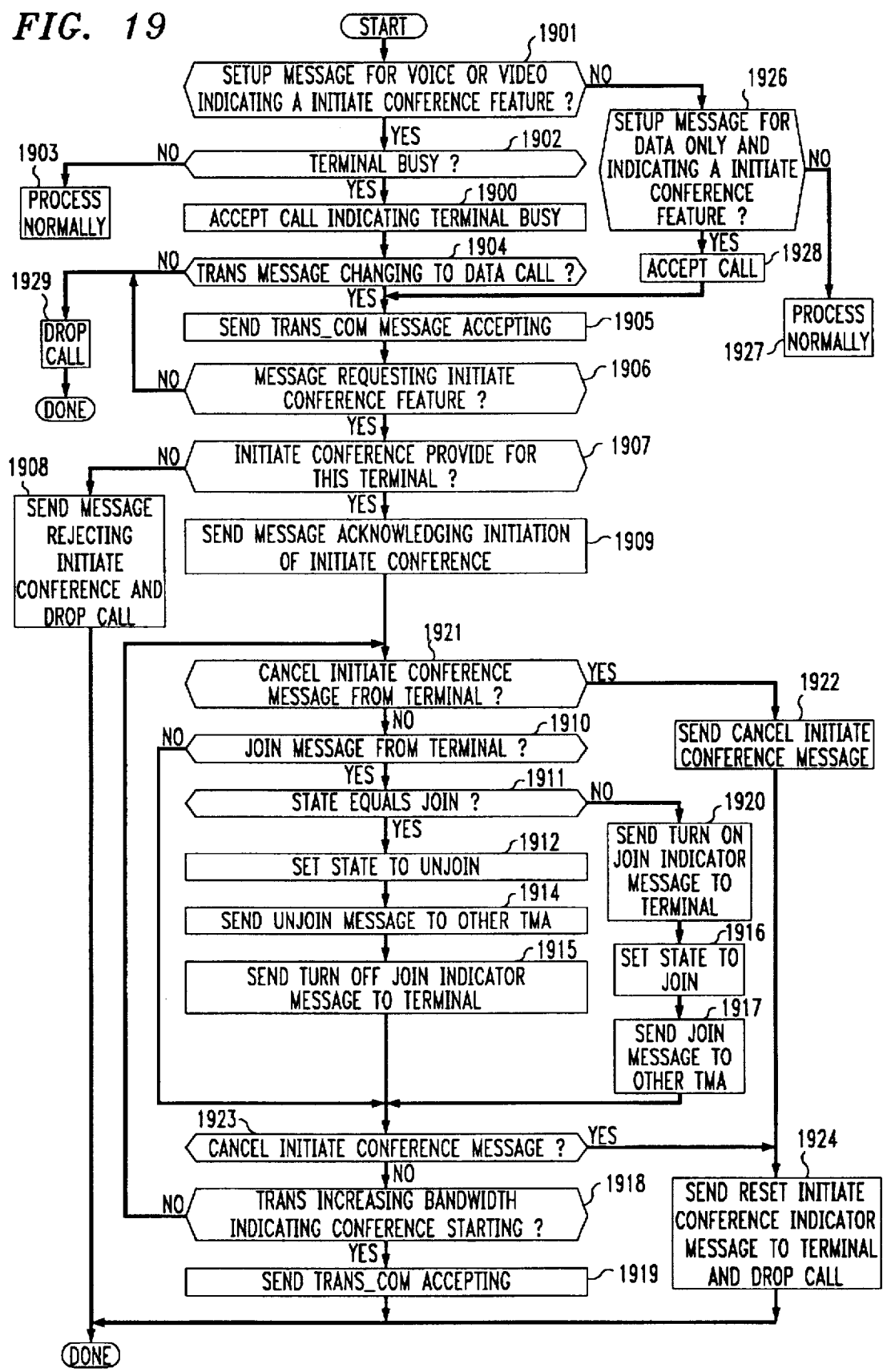

VARIABLE COMMUNICATION BANDWIDTH FOR CONFERENCE CALL INITIATION

CROSS-REFERENCE TO RELATED APPLICATIONS

B. M. Bales and S. M. Thieler, Case 26-19, "Adjustment Of Call Bandwidth During A Communication Call"; Ser. No. 08/451,282, filed May 26, 1995, U.S. Pat. No. 5,574,724.

B. M. Bales and S. M. Thieler, Case 30-21, "Variable Communication Bandwidth For Providing Automatic Call Back And Call Hold"; Ser. No. 08/451,296, filed May 26, 1995.

B. M. Bales and S. M. Thieler, Case 32-23, "Selective Participation In A Multimedia Communication Conference Call"; Ser. No. 08/451,297, filed May 26, 1995 and B. M. Bales and S. M. Thieler, Case 34-24, "Multimedia Conference Call Providing Adjustable Bandwidth For Individual Communication Terminals". Ser. No. 08/452,484, filed May 26, 1995 U.S. Pat No. 5,590,127.

These applications are filrd concurrently with this application and are assigned to the same assignee.

These applications are filed concurrently with this application and are assigned to the same assignee.

TECHNICAL FIELD

This invention relates to telecommunication conference calls and, in particular, to the establishment of a multimedia telecommunication conference call.

BACKGROUND OF THE INVENTION

With the advent of new types of telecommunication calls such as those combining high speed data transfers and video, the cost of telecommunication conference calls has increased. Because of the advantages gained by the use of different types of media presentation, users of telecommunication conference calls that involve these different types of media are willing to pay the additional price while the conference is actually taking place. However, a large amount of time can be wasted while one individual is attempting to set up a conference call. Where the telecommunication conference call consisted only of audio, the time spent setting up a conference other than the time of the participants was not of great concern. However, now because of the higher transportation costs, customers want to maximize their usage of telecommunication conference calls.

In prior art business communication switching systems (also referred to as PBXs), conference calls suffer from a major problem. This problem is trying to set up the conference call at a time when all of the telephone station sets are idle. If two individuals are talking on a telephone call and wish to add a third person, one of the individuals places the other individual on hold and actuates a conference button on their station set. Upon receiving dial tone, the individual dials the third party. If the third party is idle, the third party answers; and then, the dialing party actuates the conference button a second time to bring all three individuals into a conference call. The problem arises when the third person is busy, and it is necessary to periodically try to establish a conference with that third person. This is not only frustrating for the two individuals engaged in the telephone call, but also can be expensive if the type of call is a video call between the first two individuals. It's also expensive since useful conversation does not occur until the third person is added. A similar situation arises where a conference call is to be set up among a number of station sets. A great deal of time can be wasted for many people if one or two of the individuals of the proposed conference are busy on their telephones while the conference call is being set up. Once again, the costs becomes important if it is a video conference call.

Within prior art business communication switching systems, a meet-me conference call can overcome some of the difficulties described in the previous paragraph. A meet-me conference call is set up by each of the individuals dialing a conferencing bridge such as that provided by the Alliance dedicated teleconferencing service from AT&T. The meet-me conference does not solve the problem when a conference is being set up that was not prearranged. Even in a prearranged conference, time and money can be wasted while members of the conference wait for one or more conference members to dial into the conferencing bridge.

SUMMARY OF THE INVENTION

The foregoing problems are solved and a technical advance is achieved by telecommunication terminals that set up a multimedia telecommunication conference call with reduced bandwidth if not all participants are available to be part of the conference call. When one telecommunication terminal is initiating a conference call, the initiating telecommunication terminal first establishes low speed data links with each of the other telecommunications terminals that are to be part of the conference. When all users of the other telecommunication terminals are ready for the conference, the other telecommunication terminals signal the initiating telecommunication terminal which then adds the necessary bandwidth to the conference call to establish the multimedia telecommunication conference call. Advantageously, since the conference call is already set up, the initiating telecommunication terminal only has to add the necessary bandwidth to that call. Each participant in the telecommunication conference call designates when they are ready to have the conference call start. In addition, each participant can choose not to take part in the conference call.

When a first and second telecommunication terminals are engaged in a first call, a user of the first telecommunication terminal can setup a conference call with a third telecommunication terminal by placing the first call on hold. A second call is set up to the third telecommunication terminal by the second telecommunication terminal under control of the user. If the second call is not answered at the third telecommunication terminal, the second telecommunication terminal changes the second call to a data call and merges the first and second calls into a conference call. When the third telecommunication terminal is ready to fully participate in the conference call, the third telecommunication terminal sends a message to the second telecommunication terminal on a call path of the conference call. In response to the message, the second telecommunication terminal increases the communication bandwidth on the call path of the conference call so that the third telecommunication terminal can fully participate in the conference call.

BRIEF DESCRIPTION OF THE DRAWING

FIG. 19 illustrates, in flow chart form, operations performed by a switch node connected to a communication terminal.

DETAILED DESCRIPTION

Figure 1:
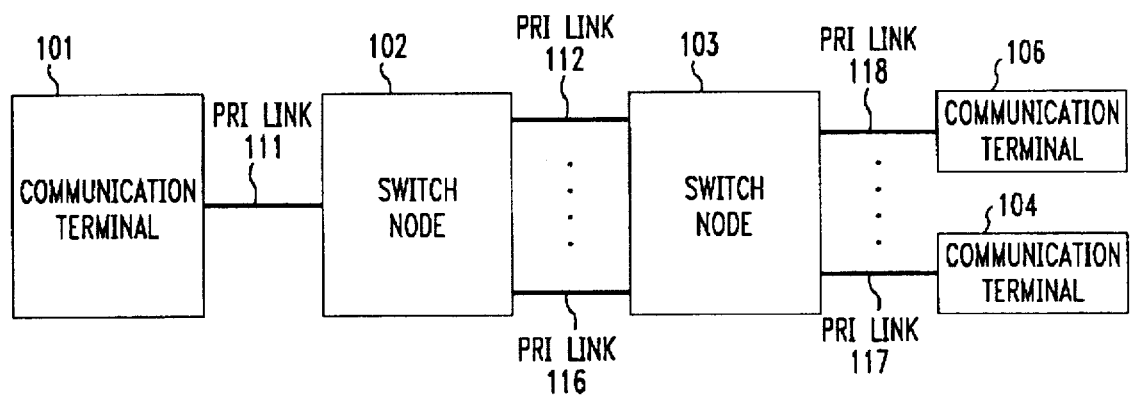
FIG. 1 illustrates a first embodiment of a system for implementing the inventive concepts.

FIG. 1 illustrates communication terminals 101, 104, and 106 interconnected by a switching network consisting of switch nodes 102 and 103. The communication terminals are interconnected to the switch nodes via primary rate interface links (PRI). A PRI link is illustrated as interconnecting a communication terminal to a switch node because it is assumed that the communication terminals will be engaging in video or high speed data calls. One skilled in the art could readily see that similar functions could be performed if the PRI links were basic rate interface (BRI) links and video and data compression was utilized. Switch nodes 102 and 103 are interconnected by a plurality of PRI links 112 through 116. One skilled in the art could readily see that additional switch nodes could be utilized with switch nodes 102 and 103. Switch nodes 102 and 103 are capable of providing conference circuits for both video and data conferencing. Switch nodes 102 and 103 advantageously are similar to those described in U.S. patent application Ser. No. 08/085, 997, U.S. Pat. No. 5,473,367, entitled "Video View Selection by a Chairperson", filed Jun. 30, 1993, and assigned to the same assignee as the present application. Also, U.S. Pat. No. 5,386,466 discloses further operations of the switch nodes. U.S. patent application Ser. No. 08/085,997 and U.S. Pat. No. 5,386,466 are hereby incorporated by reference.

To understand how the system of FIG. 1 operates consider the following two examples. In the first example, communication terminal 101 and communication terminal 104 are engaged in a communication call. During the course of this call, the user of communication terminal 101 wants to create a communication conference that includes communication terminal 106. Communication terminal 101 places communication terminal 104 on hold by transmitting the appropriate control signals to switch node 102 via PRI link 111. Communication terminal 101 then initiates a second communication call to communication terminal 106. If the user of communication terminal 106 decides to engage in a call from communication terminal 101, a call is set up between communication terminals 101 and 106. The user of communication terminal 101 then sends control signals to switch node 102 to form a communication conference between communication terminals 101, 104, and 106. On the other hand, if communication terminal 106 is busy or the user of communication terminal 106 decides not accept the call at that moment, communication terminal 101 then utilizes the TRANS message illustrated in FIG. 3 to reduce the bandwidth on the communication call between communication terminal 101 and communication terminal 106 to a low speed data call. A conference call is established, but communication terminal 106 is only transmitting and receiving data over the data link from communication terminal 101.

When the user of communication terminal 106 indicates that they wish to participate fully in the communication conference call, the user signals this desire by actuation of a "join" button on communication terminal 106. In response to that actuation, communication terminal 106 transmits to communication terminal 101 a message (referred to as a join message) indicating that communication terminal 106 wishes to fully participate in the conference. Upon receipt of the join message, communication terminal 101 utilizes the TRANS message to increase the bandwidth to communication terminal 106 so that communication terminal 106 can fully participate in the communication conference call.

In the second example, the user of communication terminal 101 wishes to start a communication conference call when the users of communication terminal 106 and 104 are prepared to participate fully in the communication conference call. The user of communication terminal 101 actuates the initiate conference button on communication terminal 101 and proceeds to enter the dialing information for communication terminal 104. Communication terminal 101 then sets up a low speed data link between communication terminal 104 and 101. Next, the user of communication terminal 101 dials the telephone number of communication terminal 106 and sets up a low speed data link. Communication terminal 101 is responsive to the dialing of communication terminal 106 to include communication terminal 106 into a conference call with communication terminal 101 and communication terminal 104. Note, whereas a conference call is indeed set up, communication terminals 101, 104, and 106 only exchange data. When a user of either communication terminal 106 or 104 wishes to participate in the conference, they actuate the join button. They can also choose not to be part of the communication conference call by actuation of the initiate conference button. When both users of communication terminals 106 and 104 have indicated they wish to join the communication conference call, communication terminal 101 utilizes TRANS messages to increase the bandwidth of the communication conference call so that all three terminals can fully participate in the communication conference call.

Consider the following two examples to help in the understanding of the operation of the switch nodes and communication terminals illustrated in FIG. 1 with respect to the new transport messages. These examples are based on a call between two communication terminals to illustrate the operation of the new transport messages in the simplest case. The operation of these messages for conference calls is discussed in detail with respect to FIGS. 10 through 15. Assume that communication terminal 101 originates a logical call to communication terminal 104. As is well known in the ISDN signalling protocol, a set up message is first transmitted from communication terminal 101 to communication terminal 104 via switch nodes 102 and 103. Each switch node is responsive to the set up message to establish the necessary call information. Upon receipt of the set up message, communication terminal 104 alerts its user and sends back to communication terminal 101 an alerting message. When the user answers the call, communication terminal 104 transmits to switch node 103 a connect message. Upon receipt of the connect message, switch node 103 establishes a logical path and transmits a connect message to switch node 102 which also establishes a logical path. When the connect message is received by communication terminal 101, it is communicated via logical path that has been established through switch nodes 102 and 103.

Figure 2:
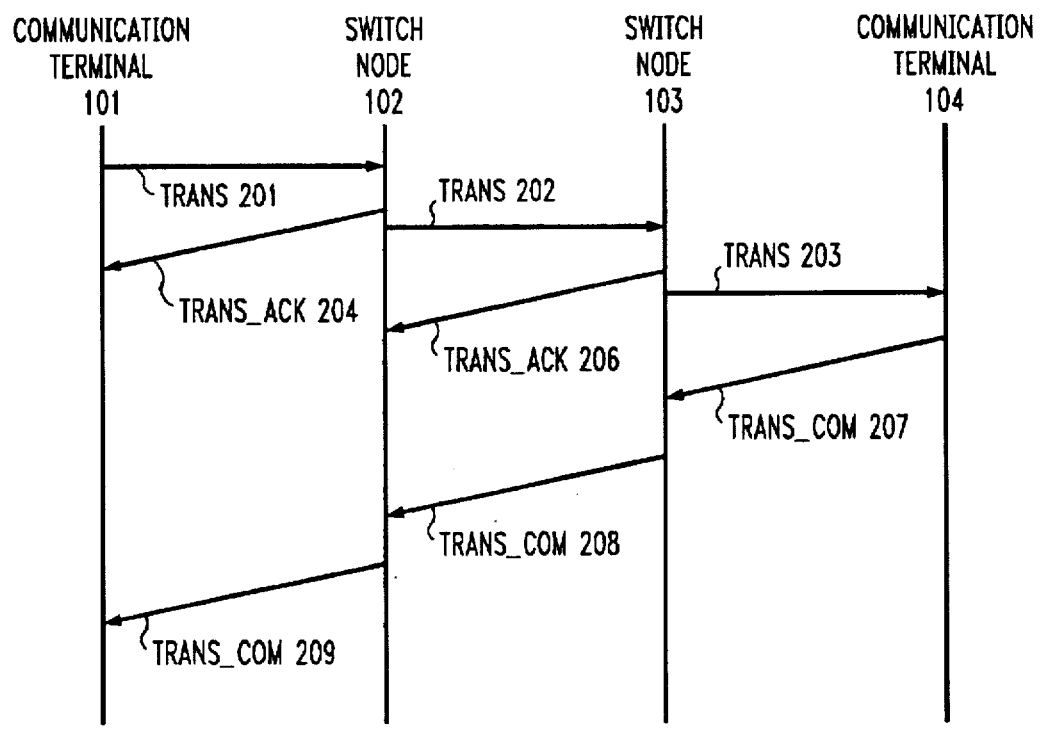
FIG. 2 illustrates the message flow embodied in the inventive concept.
Figure 3A:
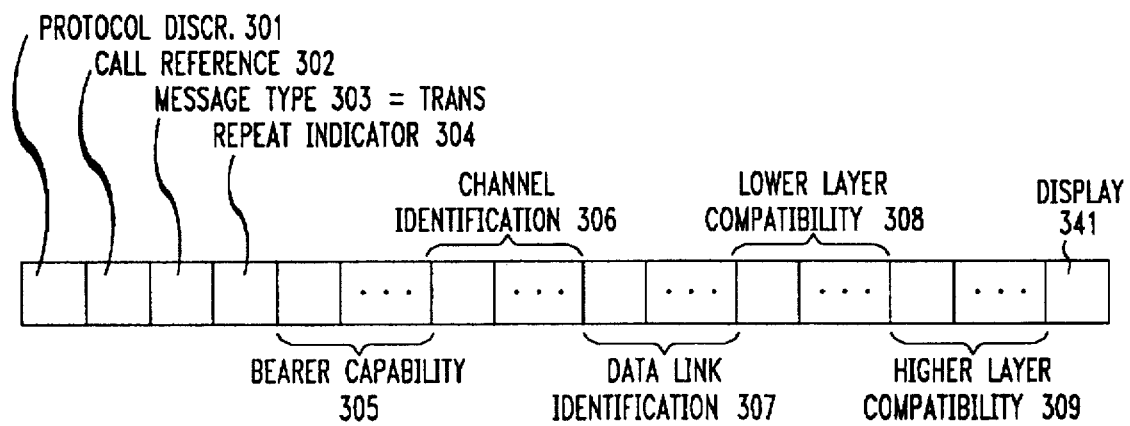
FIG. 3 illustrates the messages utilized to implement the inventive concept.
Figure 3B:
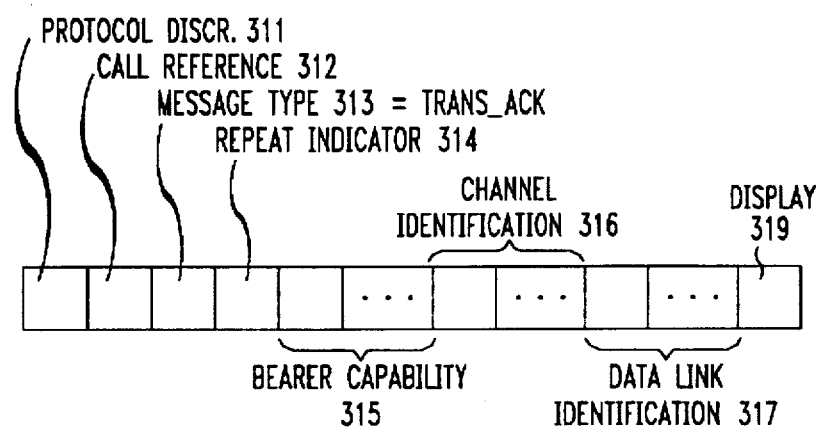
Figure 3C:
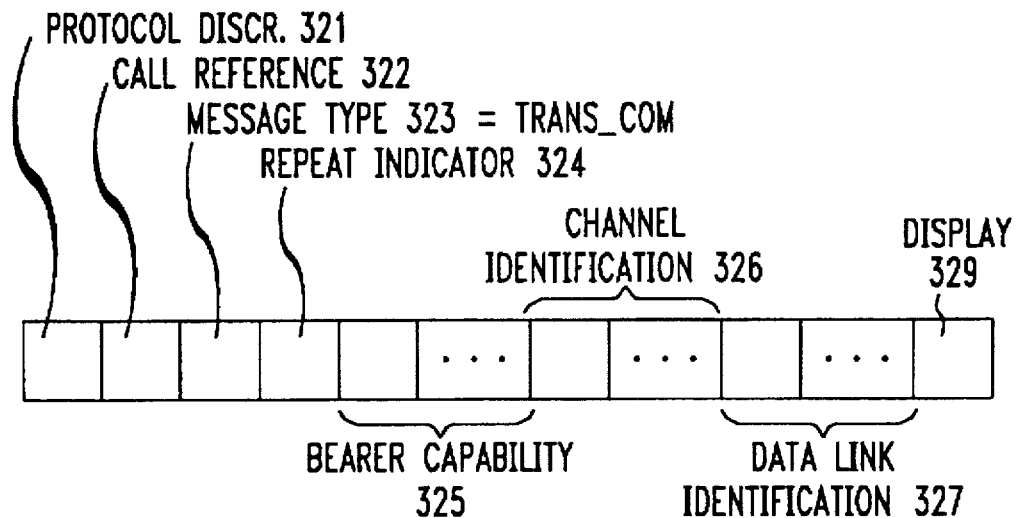
Figure 3D:
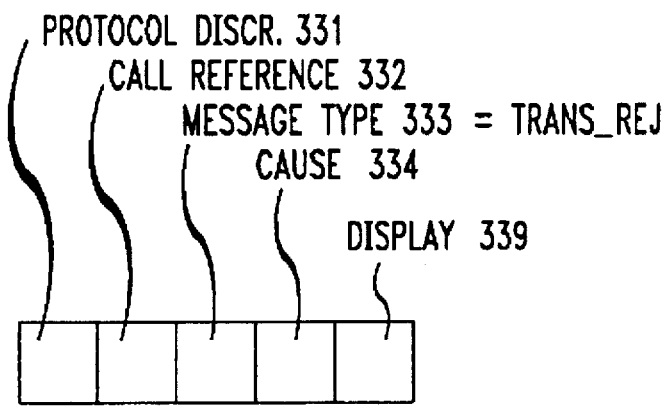

At a subsequent time, the users of communication terminals 101 and 104 desire a video capability so that they can exchange video images. To add video capability to the call, communication terminal 101 transmits TRANS 201 (transport) message as illustrated in FIG. 2 to switch node 102. TRANS 201 message requests that a video capability be added to the call. (The actual contents of the message will be discussed in greater detail later.) If switch node 102 can provide the video capability, it transmits back TRANS_ACK 204 message as illustrated in FIG. 2. In addition, switch node 102 transmits TRANS 202 message of FIG. 2 to switch node 103. This message also requests that a video capability be set up between switch node 102 and switch node 103. Assuming switch node 103 is capable of providing the video capability, it transmits back to switch node 102 TRANS_ACK 206 message and transmits TRANS 203 to communication terminal 104. If communication terminal 104 can provide the video bandwidth, communication terminal 104 transmits to switch node 103 TRANS_COM 207 message. This message is repeated back to communication terminal 101 via switch nodes 103 and 102. If at a still later point in time, the user of communication terminal 101 desires that the video capability be eliminated, the messages illustrated in FIG. 2 are once more sent through the switch nodes. However, the TRANS messages now request that the video bandwidth be removed.

In video and audio calls, the video and the audio capability can be provided in the following two ways: first, a channel can be used for the video and a second channel can be used for the audio. Second, the audio information can be included with the video information in the video channel. The transport message can cause switch nodes to drop the audio channel and add the video channel with the companion audio information.

When processing the transport message, the switch nodes have the capability of negotiating with each other using the transport acknowledge (TRANS_ACK message). To illustrate this capability consider the following example. Communication terminal 101 wishes to add an audio, video and high speed data capabilities to a logical call with communication terminal 104. Communication terminal 101 transmits to switch node 102 a transport message requesting that these three types of bandwidth be added to the call. Switch node 102 has the resources to provide that capability and acknowledges this by the transmission of an acknowledge message to communication terminal 101. Switch node 102 then transmits a transport message to switch node 103. Switch node 103 only has resources sufficient to support audio bandwidth and video bandwidth and transmits this fact to switch node 102 in a transport acknowledge message. Switch node 102 accepts these conditions. Switch node 103 then transmits a transport message to communication terminal 104 requesting that audio and video capabilities be added to the call. Communication terminal 104 only has resources to provide only audio bandwidth. Since communication terminal 104 is the endpoint, it transmits back to switch node 103 a transport complete message. The transport complete message specifies that only audio bandwidth is provided for in this call. Upon receiving the transport complete message, each switch node changes the bandwidth capability for the call to audio only.

FIG. 3 illustrates the details of the four new messages utilized to implement the inventive concepts illustratively with respect to CCITF ISDN Q.931 standard of messages and procedures. One skilled in the art can readily see that the inventive concepts could be applied to other standards. The transport message is TRANS 300. The transport message consists of information elements (IE) 301-309 and 341. Protocol discriminator 301 IE defines the protocol that is being used. It defines that the protocol is ISDN Q.931 in the present embodiment. Call reference IE 302 gives the call reference number that defines the call for which the transport message is modifying the bandwidth. Message type IE 303 is set equal to TRANS since this is the transport message. Repeat indicator IE 304 defines whether the transport message is being used to add, remove, or change bandwidth on the call designated by call reference IE 302.

Bearer capability IEs 305, channel identification IEs 306, data link identification IEs 307, lower layer compatibility IEs 308, and higher layer compatibility IEs 309 define the totality of the transport capabilities being defined by the transport message. Lower layer compatibility IEs 308 and higher layer compatibility IEs 309 are used only by the endpoints. Whereas, bearer capability IEs 305, channel identification IEs 306, and data link identification IEs 307 are utilized by the switching nodes within the network providing transportation for the call. Note, that the endpoints also utilize IEs 305, 306, and 307. Bearer capability IEs 305 define the requested capabilities in high level definitions such as voice, data, and video. The channel identification IEs 306 define the logical interface and physical channel within that physical interface. Between two switching nodes, the switching nodes negotiate a logical interface number for each interface between them. A network layer is responsive to the logical interface number to convert it to a system interface number (sintf) which lower layers convert to a physical interface number. For clarity, the high level description refers to the channel identification IEs as specifying the physical interface. For example, if video is being requested, then one of the channel identification IEs 306 for that request defines the physical interface and the channel such as channel 1 which is a 384 Kbs channel within the specified PRI link. If a voice capability was being requested, one of the channel identification IEs defines a particular B channel such as channel 23. An IE in the bearer capability IEs 305 requesting video has the same position in the bearer capability IEs 305 as the corresponding IE designating the physical interface and channel in the channel identification IEs 306. If packet data links are being requested, these are specified as to physical channels in channel identification IEs 306 with additional information being specified in the data link identification IEs 307. The IEs for data link identification are arranged in order as needed to support channel identification IEs 306. The information in bearer capability IEs 305 specifies when an IE from data identifications IEs 307 is needed. For example, if bearer IEs 305 specified: video, voice, and data, channel identification specifies the physical and only one data link identification IEs 307 is used. This IE would specify what logical link on the physical channel was to be used.

Figure 4:
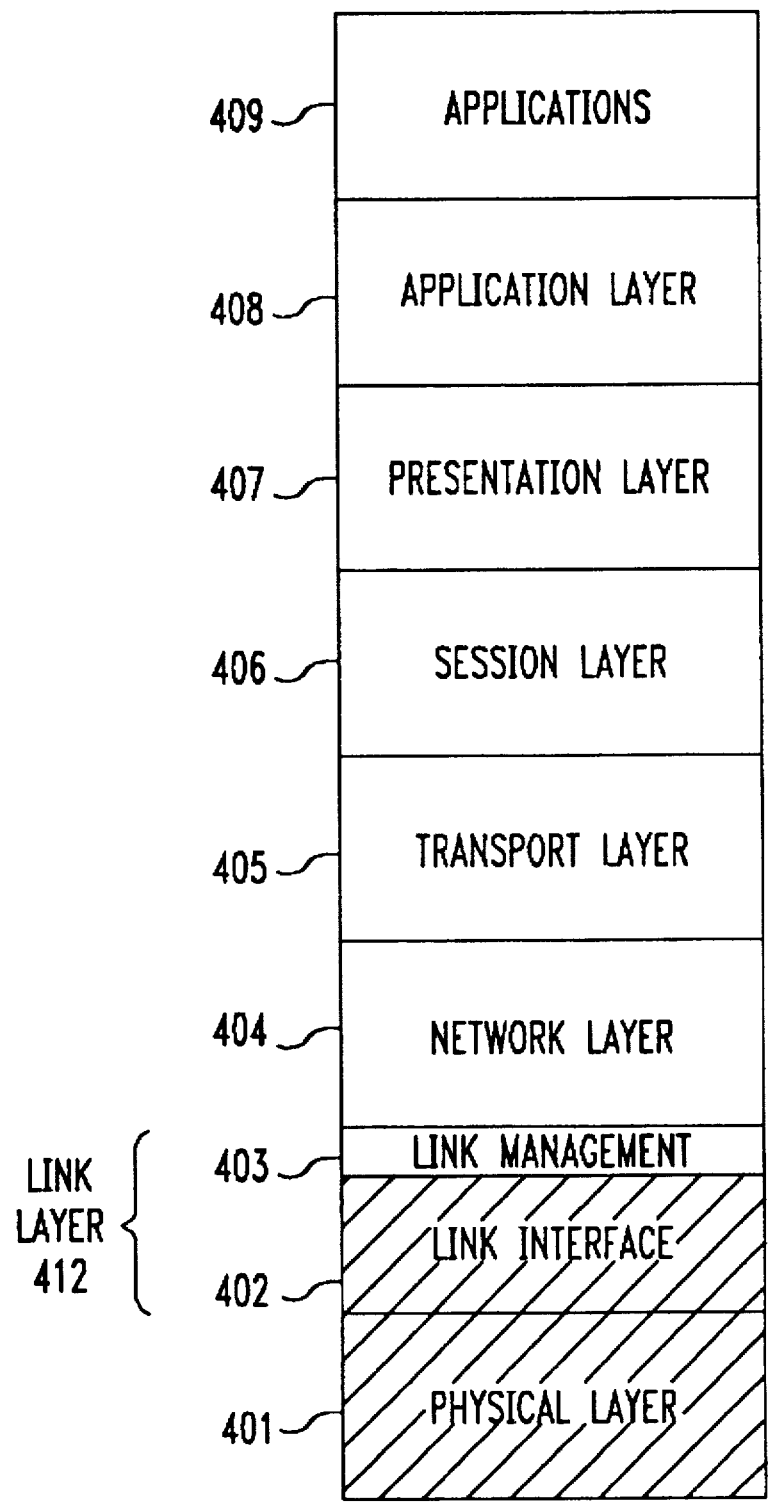
FIG. 4 illustrates a software architecture for use with the inventive concept.

Lower layer capability IEs 308 and higher layer capabilities 309 are usually utilized only by the endpoints, and these IEs are directed to defining for the destination endpoint what type of a call is being set up and the protocol being used. The low layer compatibility IEs 308 are utilized by physical layer, link management layer, and network layer as illustrated in FIG. 4; whereas, higher layer compatibility IEs 309 are utilized by software layers above network layer 404 of FIG. 4. To understand the relationship between the layer capabilities IEs and the bearer capability IEs, consider the following example. If a user wishes to set up a data packet connection utilizing LAPF protocol, from communication terminal 101 to communication terminal 104 the user can do this using two methods. The first method is to specify in the bearer capability that a LAPF packet connection is to be set up. In this case, it is not necessary to include any information in the lower layer capability IEs 308 and may not be necessary to include any information in the higher layer capabilities 309. The switch nodes are responsive to the bearer capabilities to set up the packet switching connection in the most convenient manner. In general, the switch node will set up this packet connection as a packet connection rather than as a circuit connection. In the second example, the user wishes to have a 64 Kb circuit connection set up through switching nodes 102 and 103 and only implement the LAPF protocol at the endpoints, communication terminals 101 and 104. In this case, communication terminal 101 would request in the bearer capability 305 of the transport message a 64 Kbs per second circuit switch connection. The transport message then would include in the lower layer capability of IEs 308 the fact that this is to be a packetized data connection utilizing the LAPF protocol. In this manner, the packetized connection is guaranteed to have a predictable transmission time through switching nodes 102 and 103. In addition, the purpose may be to run a proprietary packet protocol on the circuit switch 64 Kbs data connection through switch nodes 102 and 103. Higher layer capability IEs 309 define to presentation layer 407 of FIG. 4 the high layer protocols that are to be used with information being received by the network layer. Presentation layer 407 conditions messages for use by the applications in applications layer 409 of FIG. 4. Examples of the types of protocols that presentation layer 407 may operate with are: X400 email standard, g4 fax standard, file transfer, or screen sharing standard. As can be easily seen, these higher level protocols are of no concern to the intervening switching nodes 102 and 103.

The transport acknowledge message, TRANS__ACK 310 is illustrated in FIG. 3. IEs 311, 312, 314 have identical functions to those described for IEs 301,302, and 304. Message type IE 313 is set equal to TRANS__ACK. Upon receiving a transport message, a switch node within the network responds with a transport acknowledge message. If the receiving switching node can provide all of the transport capabilities requested in IEs 305, 306, and 307, the transport acknowledge message only consists of IEs 311-314. If the receiving switching node cannot provide a particular transport capability, that transport capability is defined in IEs 315 and 316 or IEs 317 and 316. For example, if the transport message has requested video transport which the receiving switching node cannot provide, then the video capability is specified in IEs 315 and 316 of the transport acknowledge message. Display IE 319 may define the reasons why this capability is not provided. If the sending switching node does not wish to accept the reduction of transport capabilities, the sending switching node's only option is to abandon the transport message request. Once again, call reference IE 312 defines which call the transport acknowledge message is associated with.

The transport complete message, TRANS__COM 320 is also illustrated in FIG. 3. The transport complete message is utilized to define to each switching node that is communicating the call the resulting transportation capabilities that have been added, removed, or changed with respect to the call. If all switching networks in the call path have accepted the requested transport capability, the transport complete message consists only of IEs 321-324. If one or more of the requested transport capabilities cannot be provided those capabilities are defined in IEs 325, 326, and 327. Each switching node in the call path retains a record of any transport capability that it may have eliminated from the receive transport message and includes this eliminated transport capability in the transport complete message. The result is that when the originating endpoint receives the transport complete message that message defines to the originating endpoint what the transport capability of the call is. Also, as intervening switching network nodes receive the transport complete message they eliminate transport capability that they had agreed to provide for the call if that transport capability is not present in the transport complete message.

Transport reject message, TRANS__REJ 330 is utilized to reject a transport message. IEs 331-333 and 339 are identical in function to IEs 301-303 and 341 of the transport message. IE 334 defines the reason why the transport message is being rejected.

FIG. 4 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 401 is to terminate physical links. Specifically, physical layer 401 is responsible for maintaining physical channels and for controlling physical subchannels thereon. Physical layer 401 comprises a software portion and physical interfaces. Further, the software portion of physical layer 401 is responsible for the direct control of the physical interfaces to which physical links communicating PRI and BRI information terminate. Physical layer 401 presents to link layer 412 physical subchannels and physical channels as entities controllable by link layer 412.

The primary function of link layer 412 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 412 and physical layer 401. (An example of this type of protocol is the LAPD packet protocol used in ISDN Q.921. In the ISDN standard, link layer 412 terminates the LAPD protocol.) Link layer 412 can support multiple protocols so that the upper layers are uneffected by the different protocols being utilized. Further, link layer 412 allows higher software layers to control physical layer 401 in an abstract manner.

As seen in FIG. 4, link layer 412 is divided into link interface 402 and link management 403. The reason for this division is set forth herein below. It will be helpful at this point to discuss the communication of ISDN signals over a D channel to help readers, for example, who have only a rudimentary knowledge of the communication of ISDN signals over a D channel. At link layer 412, a plurality of logical links is established on a D channel. Only one of these logical links communicates ISDN control signals, and this logical link is referred to herein as a logical D channel (LDC). The LDC is identified by a logical D channel number (LDCN).

Link interface 402 does the majority of the functions performed by link layer 412, including the establishment of the logical links. Link management 403 identifies the various link interfaces for higher software layers. Further, link management communicates information between the logical links and higher software layers.

Network layer 404 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if communication terminal 101 receives a call from switching node 102 via PRI link 150, network layer 404 of communication terminal 101 negotiates with its peer layer (the corresponding network layer 404 in switching node 102) in order to obtain allocation of a B channel in PRI link 150—a procedure later to be repeated if a second B channel is desired. This negotiation is carried out using standard ISDN Q.931 messages such as the call setup and connection messages via the LDC setup on the D channel of PRI link 150. Network layer 404 identifies all B channels of given interface with the LDC for that interface. Network layer 404 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 404 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 405, is the key element that allows the routing of a call through a complex system having multiple nodes as illustrated in FIG. 1. Its primary function is to manage the routing of calls externally, i.e., between switching nodes. Transport layer 405 views the system of FIG. 1 in terms of nodes and is concerned with routing calls from its own node to other nodes or endpoints. (As explained in the detailed discussion of session layer 406, that layer, not transport layer 405, interprets logical destination information, such as a telephone number, to determine the destination node of a call and to establish an intra-node path by using the connection manager application.) In an overall system comprising multiple switching nodes such as communication terminal 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 405 is the first layer that starts to take a global view of the overall system illustrated in FIG. 1. Transport layer 405 uses information provided by session layer 406 to select the inter-node path. The transport layer performs its task of routing between various nodes by the utilization of tables defining the available paths and the options on those paths. These tables do not define all paths but only those paths which the node has already used.

Communication between transport layers is done by network layer 404 using established LDCs. Transport layer 405 communicates information destined for its peers to network layer 404, and network layer 404 packages this information within the information elements, IEs, of standard ISDN Q.931 messages. Network layer 404 uses the LDC that has been set up to a particular node to communicate this information to its peer network layer. Similarly, when another network layer receives information of this type, the other network layer unpackages information and then directs the information to the transport layer.

The primary function of session layer 406 is to establish communication among endpoints with all endpoints considered to be applications including, for example, a BRI station set is considered an application. Significantly, these endpoints may be applications such as TMA applications. In any event, connections between such endpoints is considered a call. A session (call) is set up by session layer 406 any time two applications require communication with each other. As noted earlier, session layer 406 deals only in terms of switching nodes and applications on those switching nodes and relies on transport layer 405 to establish paths to other switching nodes. Session layer 406 identifies the called application by an address which previously in the telecommunication art was thought of as only a telephone number but has a much broader concept in the Q.931 protocol. From this address, session layer 406 determines the destination switching node. Session layer 406 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 407 of FIG. 4 invokes a complex protocol in order to groom the information being communicated between applications so that the applications are totally divorced from the protocol used to communicate the information. A presentation level protocol allows an application to communicate with a peer application across a transport path.

Finally, application layer 408 manages the resources needed by the applications running at software layer 409. When an application at software layer 409 is communicating with another peer application, the application is unaware of how many other applications exist or where these other applications are located. It is the function of application layer 408 to determine and use such details, consequently allowing the applications to be written in a very abstract manner.

Further information on the operation and software structure of layers 401 through 409 is given in U.S. Pat. No. 5,386,466, entitled "Automatic Initialization of a Distributed Telecommunications System. U.S. Pat. No. 5,386,466 is hereby incorporated by reference.

Figure 5:
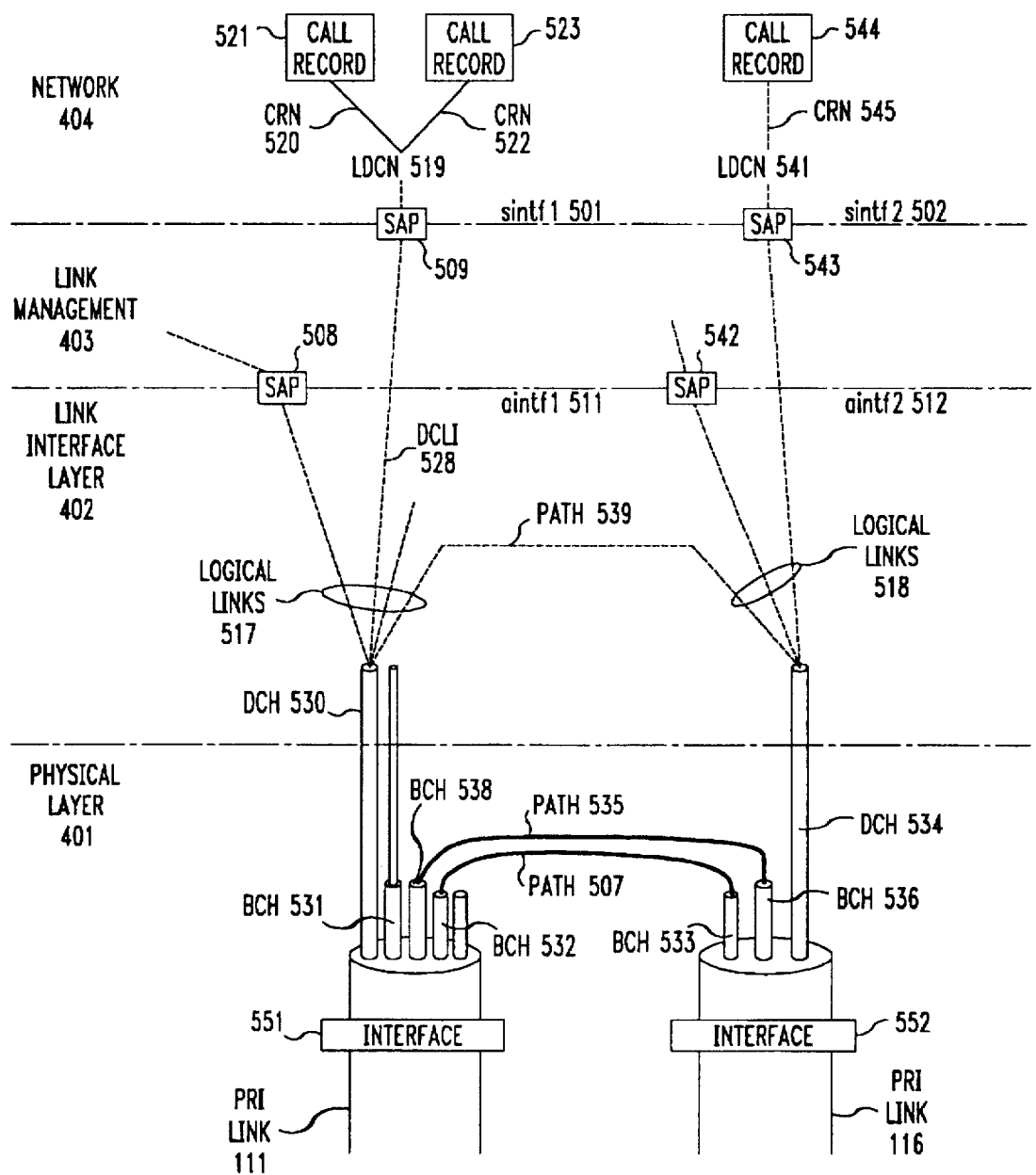
FIG. 5 logically illustrates the signaling and transport paths that are set up within a switch node.

FIG. 5 logically illustrates the general relationships between data link connection identifiers (DLCI), service access point identifiers (SAPI), terminal end identifiers TEI), system interface numbers (sintf), switches angel interface numbers (aintf, logical D channel numbers (LDCN), call reference numbers (CRN), and the various software layers. As illustrated in FIG. 5, the pair of link interface layers and physical layers are implemented on an angel. (The concept of angels is explained in U.S. Pat. No. 5,386,466.) Link interface layer 402 and physical layer 401 are implemented by a local angel. A node processor in switch node 102 implements link management 403, network 404, and higher layers. The node processor provides overall control of switch node 102. Sintf, switch and aintf numbers correlate to physical interfaces. The sintf numbers are utilized by network software layer 404 and higher software layers to identify physical interfaces. In addition, two switching nodes, interconnected by a link that is terminated on both ends by a physical interface, negotiate a logical interface number for the link during initialization of the link.

When a transport message is received, network layer 404 converts the logical interface numbers in the channel identification IEs to sintf's. Network layer 404 views the physical interfaces as being identified by sintf1 501 and 502. Link management 403 makes a conversion between the sintf numbers and the switch and aintf numbers which together represent the physical interface. For example, link management 403 converts sintf1 501 to the local angel and aintf 511. Link interface layer 402 utilizes aintf 1511 to identify physical interface 551. There is a one for one correspondence between sintf1 501 and sintf2 502 and aintf1 511 and aintf2 512.

The sintf and aintf numbers identify specific interfaces, and each interface has a number of channels. For example, PRI interfaces 551 and 552 each have 24 channels. Network layer 404 identifies the channels associated with a particular sintf by using the actual physical channel numbers, and similarly, link interface layer 402 utilizes the physical channel numbers in association with an aintf number. This is possible because the specifications of the ISDN standard designate that physical channel 24 is used to perform signaling. Network layer 404 and higher layers utilize sintf numbers in order to control the link interface layers and physical layers to interconnect physical channels and to create specific protocols on these channels. The manner in which B channels are interconnected through physical networks such as network 515 is not illustrated in FIG. 5 except in a logical manner, e.g. path 507.

Further, FIG. 5 logically illustrates the utilization of the various channels and the points at which these channels are terminated and at which information is utilized. B channel 532 of interface 551 is interconnected to B channel 533 of interface 552 by path 507. Path 507 is made through a network internal to a switch node. It would be obvious to one skilled in the art that similar paths could be made between B channels in interface 551 and 552. The circuit switching of B channels is performed at the physical layer; whereas, packet switching or frame relaying is performed at the link interface layer. Greater detail on operations of the layers of FIGS. 5 and 6 in setting up a call are set forth in U.S. Pat. No. 5,386,466.

This section describes the transport messages from the prospective of applications software layer 409, session software layer 406, transport software layer 405, and network software layer 404 through switch node 102. To clarify the explanation, first a brief description is given of how a call is initially set up through switch node 102.

Figure 6:
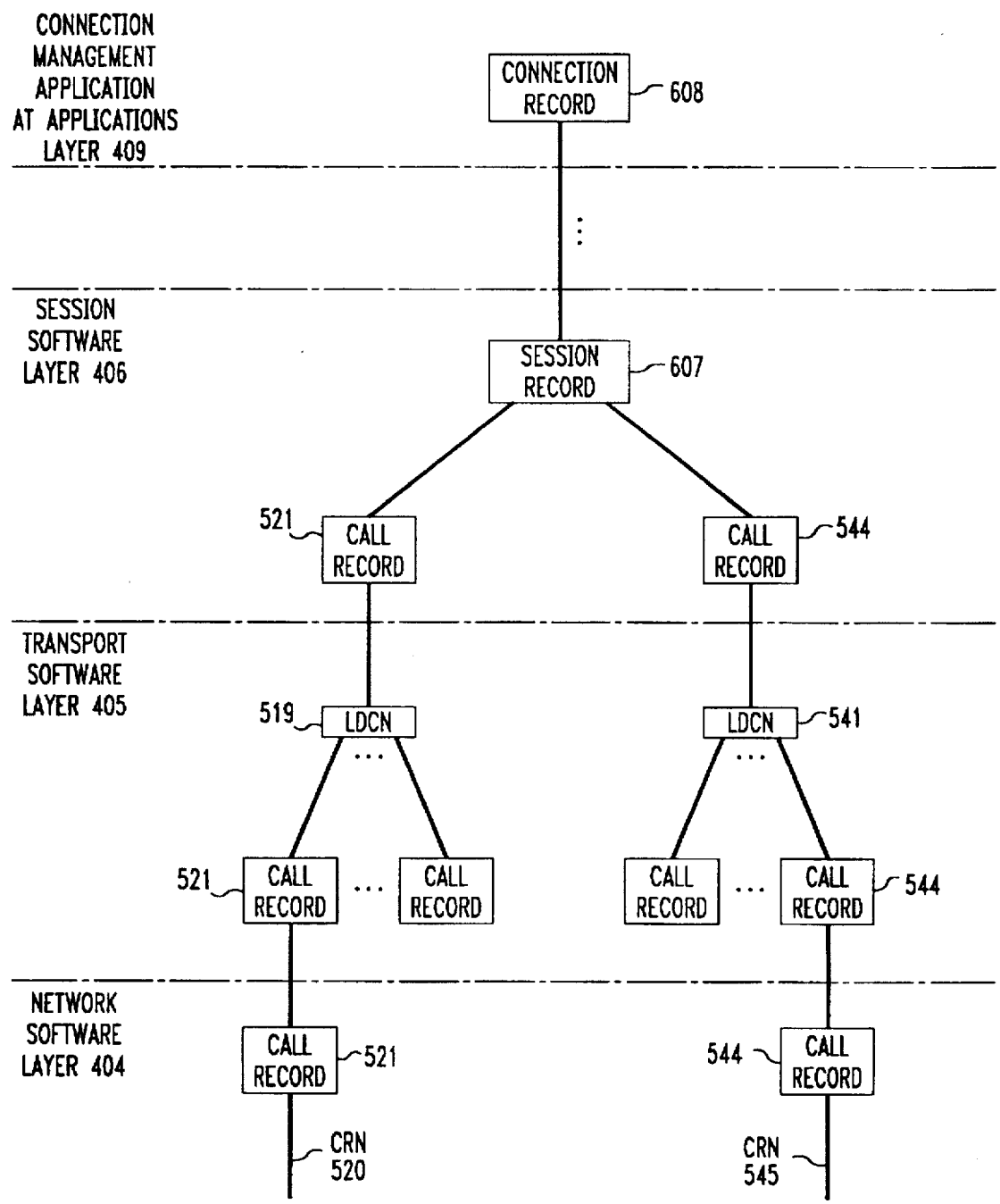
FIG. 6 illustrates the logical structure of a call through the network, transport, session, and application software layers.

FIG. 6 illustrates the manner in which calls are identified and processed between network software layer 404, transport software layer 405, session software layer 406, and applications software layer 409. Switching node 102 is executing these software layers. At network software layer 404, each half of a call is identified by the CRN number, e.g. CRN 520, and a call record, e.g., call record 521, as previously described with respect to FIG. 5. As can be seen from FIG. 6, the call record is common throughout the software layers, and each layer uses additional information along with the call record. The call records are taken from a common table within each switching node, and a call record number is unique within a particular switching node.

Transport software layer 405 identifies each half of a call by the LDCN and call record number. The LDCN is utilized because the information illustrated in the level 4 routing tables is identified by the LDCN number which denotes the link (or set of links) out of a switching node to another switching node. Notice that the call record is identified identically at all three software layers as illustrated in FIG. 6 for a particular call. Session software layer 406 is the point within the software architecture where halfs of calls are joined together for purposes of exchanging signal information by each call having a unique session record set up for it such as session 607. The session record is associated with two call records such as call record 521 and call record 544 with each call record representing half of a call. (Each half of a call is referred to as a "half call".) An exception to this rule is if the call is to an application. In that case, only one call record is utilized since the other half of the call terminates at the application software layer.

To understand how calls are processed by the three software layers illustrated in FIG. 6, first consider the example of setting up a call through switch node 102. For this example, reference must be made to FIG. 5 which illustrates the interfaces associated with call records 521 and 544. Call record 521 is associated with PRI link 111, and call record 544 is associated with PRI link 116 in the following example.

Assume that a call is being placed from communication terminal 101 to communication terminal 104 via switching node 102. LDCN 541 is associated with PRI 116 which interconnects switching node 102 to switching node 103 as illustrated in FIG. 1. Further, assume that the node number in the setup messages designates communication terminal 104. (The manner in which routing decisions are made in switch node 102 for a call from communication terminal 101 to communication terminal 104 is set forth in U.S. Pat. No. 5,386,466.) When the setup message is received from communication terminal 101 via PRI link 111, network software layer 404 generates a setup indication which is communicated to transport software layer 405 and establishes call record 521 which starts the setting up of the first half call. Transport software layer 405 examines the node number and determines that switching node 102 is not the destination switching node; hence, layer 406 does not set a node flag. If the node flag was set, this indicates that the call terminates on switch node 102. The dialed number along with the node flag is communicated to session software layer 406 which, because the node flag is not set, does not attempt to route a call based on the dialed number. Since in the present example the node flag is not set, session software layer 406 establishes session record 607 and call record 544 is selected which starts the setting up of the second half call. The node and the call record number are then communicated to transport software layer 405 as a setup request. Transport software layer 405 interrogates the level 4 routing table and determines that LDCN 541 is a path to communication terminal 104. Transport software layer 405 then associates call record 544 with LDCN 541 and transmits the setup request to network software layer 404 which then establishes communication with switching node 103 via PRI link 116.

After switch node 102 has sent a setup message to switch node 103 via PRI link 116, the network software layer of switch node 103 responds with a call proceeding. Network software layer 404 is responsive to the call proceeding message to notify a connection management application that it should establish the connection through switch node 102 switching network to interconnect B channel 532 and B channel 533 so as to establish path 507. Session record 607 points to connection record 608. Connection record 608 is maintained by the connection management application which is executing at applications layer 409. The connection management application is responsive to the message from network software layer 404 to establish this connection and to enter into connection record 607 the parameters of the internal connection.

To further understand how the transport messages are utilized to increase or decrease bandwidth through switch node 102, consider the following example. Assume that the setup message that was described in the previous paragraph setup a voice connection through switch node 102 which resulted in path 507 of FIG. 5 being set up through the switching network of switch node 102. Next, communication terminal 101 requests that a packet switch connection be established on D channel 530 and that a 64 Kb data channel be established on channel 538 by using a transport message.

In order to establish the additional bandwidth necessary for the data link executing the LAPD protocol and a data channel having 64 Kbs, communication terminal 101 transmits to switch node 102 a transport message that has the following information. Call reference IE 302 is set equal to CRN 520 of FIGS. 5 and 6, message type IE 303 is set equal to TRANS. Repeat indicator IE 304 is set to add bandwidth. Bearer capability IEs 305 are as follows. The first bearer capability IE specifies a packet data link using the LAPD protocol, and the second IE is set equal to a circuit data link with 64 Kbs of bandwidth. Channel identification IEs 306 are as follows. The first IE specifies interface 551 utilizing the logical interface number, and specifies the use of D channel 530. The second IE of the channel identification IEs 306 specifies interface 551 and B channel 538. A single data link identification IE 307 follows and specifies that one of the logical links 517 is to be used for packet data. Lower layer capability IE 308 specifies the proprietary protocol that communication terminal 104 is to implement with respect to the 64 Kb data channel. Higher layer compatibility IE 309 specifies that the X400 email protocol standard is being implemented. This transport message is received and disassembled by network software layer 404 of FIG. 6. If network software layer 404 is capable of providing the requested transport capabilities, network transport layer 404 responds with a transport acknowledge message that contains only IEs 311, 312, 313, and 319. If network 404 cannot provide one of the requested transport capabilities, it identifies the particular transport capability that could not be provided in IEs 315, 316, and 317, and indicates in the repeat indicator 314 that this particular transport capability must be deleted. In addition, the transport acknowledge message could also indicate using another bearer capability, channel identification, and data link identification IEs, as an alternative to what had been requested.

In the present example, network software layer 404 can provide the requested transport capabilities. Network software layer 404 then transmits to session software layer 406 via LDCN 519 of transport software layer 405 the request to add transport capabilities. Session software layer 406 utilizes session record 607 to call record 544 to determine that the call utilizes LDCN 541 and uses LDCN 541 to notify network software layer 404 that additional work is to be done with respect to call record 544.

Returning for a moment to the left half of the call that is illustrated by call record 521 and LDCN 519 of FIG. 6. Network software layer 404 transmits to the connection management application the new parameters that have been added to the connection identified by call record 521. The connection management application is responsive to this information to store the additional connection information in connection record 608.

In the right half of the call that is identified by call record 544 and LDCN 541, network software layer 404 is responsive to the bearer capability IEs of the message that has been received from communication terminal 101 to determine which transport facilities should be utilized to meet the requirements of these bearer capability IEs. As illustrated in FIG. 5, network software layer 404 utilizes one of the logical links of logical links 518 to provide the data link utilizing the LAPD protocol and B channel 536 to provide the capabilities of the 64 Kb data channel. Note, if network software layer 404 had available a B channel which had been subdivided into logical links, network software layer 404 could have used one of these logical links for the data link executing the LAPD protocol. Network software layer 404 now forms a new transport message that includes the bearer capability IEs that are identical to those received from communication terminal 101 and channel identification IEs 306 and data link identification IEs 307 that are specific to the transport capabilities being utilized with interface 552. The lower layer compatibility IEs 308 and higher layer compatibility IEs 309 are simply transported up the left half of the call to session software layer 406 which then transmits them down the right half of the call where they are assembled into the new transport message by network software layer 404. Network software layer 404 then transmits the transport message to its peer network software layer in switch node 103.

In our present example, the network software layer in switch node 103 accepts all of the transport capabilities requested in the transport message. The network software layer in switch node 103 responds with a transport acknowledge message which contains no IEs 315, 316, or 317. Network software layer 404 in switch node 102 is responsive to this transport acknowledge message to transmit to the connection management application in application layers 409 of FIG. 6 the parameters for the left half of the call so that these can be stored in the connection record 608. The connection management application is also responsive to this information to control the switching network of switch node 102 to setup path 535. In addition, connection management application transmits a message to link interface layer 402 to setup path 539.

At this point, paths 507, 535, and 539 are set up through switch node 102. In the present example, when switch node 103 attempts to establish the original transport capabilities, communication terminal 104 is unable to provide the data link utilizing the LAPD protocol. The result is that switch node 103 in the left half of the call which is similar to that illustrated in FIG. 6 has recorded in its connection record the voice bandwidth, the data link using LAPD protocol, and the 64 Kb data channel. However, in the connection record for the right half of the call, only the voice call and the 64 Kb data link are recorded. Upon receiving the transport complete message from communication terminal 104, via network software layer, the connection management application in switch node 103 only connects the 64 Kb data link. Note, that the voice call connection was made during the setup process. Communication terminal 104 then transmits a transport complete message that identifies the bearer capability, channel identification IEs, and data link identification IEs that are in use. This message is received by switch node 103 and is transferred up the right half of the call through the software layers to session software layer 406 of switch node 103 which communicates it down the left half of the call to network software layer 404 of switch node 103. Network software layer 404 eliminates the data link capabilities and informs the connection management application that the data link is no longer being utilized. In response, connection management application of switch node 103 eliminates the data link information from connection record of switch node 103. Network software layer 404 in switch node 103 then assembles a transport complete message that details the fact that only the 64 Kb data link has been set up and transmits this transport complete message to switch node 102.

When network software layer 404 of switch node 102 receives the transport complete message from switch node 103, it informs the connection management application that path 539 is to be eliminated. The connection management application then eliminates from connection record 608 reference to the data link executing the LAPD protocol. Network layer 404 then transmits the transport complete message through session software layer 406 down into the left half of the call. Network software layer 404 is responsive to this transport complete message to notify the connection management application to eliminate the reference to the data link executing the LAPD protocol from connection record 608. The connection management application also transmits a message to link interface layer 402 to remove path 539. In the left half of the call, network software layer 404 then assembles another transport complete message for transmission to communication terminal 101.

At a later point in time, communication terminal 101 determines that the 64 Kb data link is no longer required, communication terminal 101 transmits a transport message where repeat indicator 304 is set equal to remove and the bearer capability IEs 305, channel identification IEs 306, and data link identification IEs 307 specify that the 64 Kb data link is to be removed. Switch node 102 then repeats this message and sends it to switch node 103. Upon receiving the transfer acknowledge message back from switch node 103, network software layer 404 requests that the connection management application remove path 535. In addition, connection management application updates the connection record 608 as requested by network software layer 404. When the transport message requesting the removal of the data link is received by communication terminal 104, it responds with a transport complete message that specifies that this removal should have taken place.

Returning now to when communication terminal 104 received the transport message that set up the 64 Kb data channel, communication terminal 104 responds in a similar manner with respect to IEs 305 through 307 as the other switch nodes did. The termination point of a call is a terminal management application that is executed in applications level 409 of FIG. 4. Greater details on the functions of a terminal management application are given in U.S. Pat. No. 5,182,751 and U.S. Pat. No. 5,386,466. Briefly, a terminal management application provides all of the control functions required to terminate a call and to allow the terminal to utilize the communicated data. A terminal management application can be executed on a switch node whereby the majority of the terminal control functions are done in the switch node rather than within the communication terminal. On the other hand, a communication terminal, such as communication terminal 101, does have its own computer and is executing the software structure illustrated in FIG. 4. In this case, the terminal management application is executing on the terminal. As illustrated in FIG. 1, communication terminal 101 is then the termination point of the call. However, with a different type of communication terminal being utilized for communication terminal 101, the terminal management application could be executing in switch node 102 which would be the termination point of the call.

When the transport message was received to set up the 64 Kb data channel, this message was transported to the terminal management application at applications level 409. The terminal management application then requested that the connection manager request that link interface layer 402 implement the proprietary protocol that is defined in the low layer compatibility IEs 308 so that the link interface layer can properly use the low level proprietary protocol. In addition, the connection manager application instructs the presentation layer 407 of communication terminal 104 to implement the X400 email standard as defined in by the higher layer compatibility IE 309.

Figure 7:
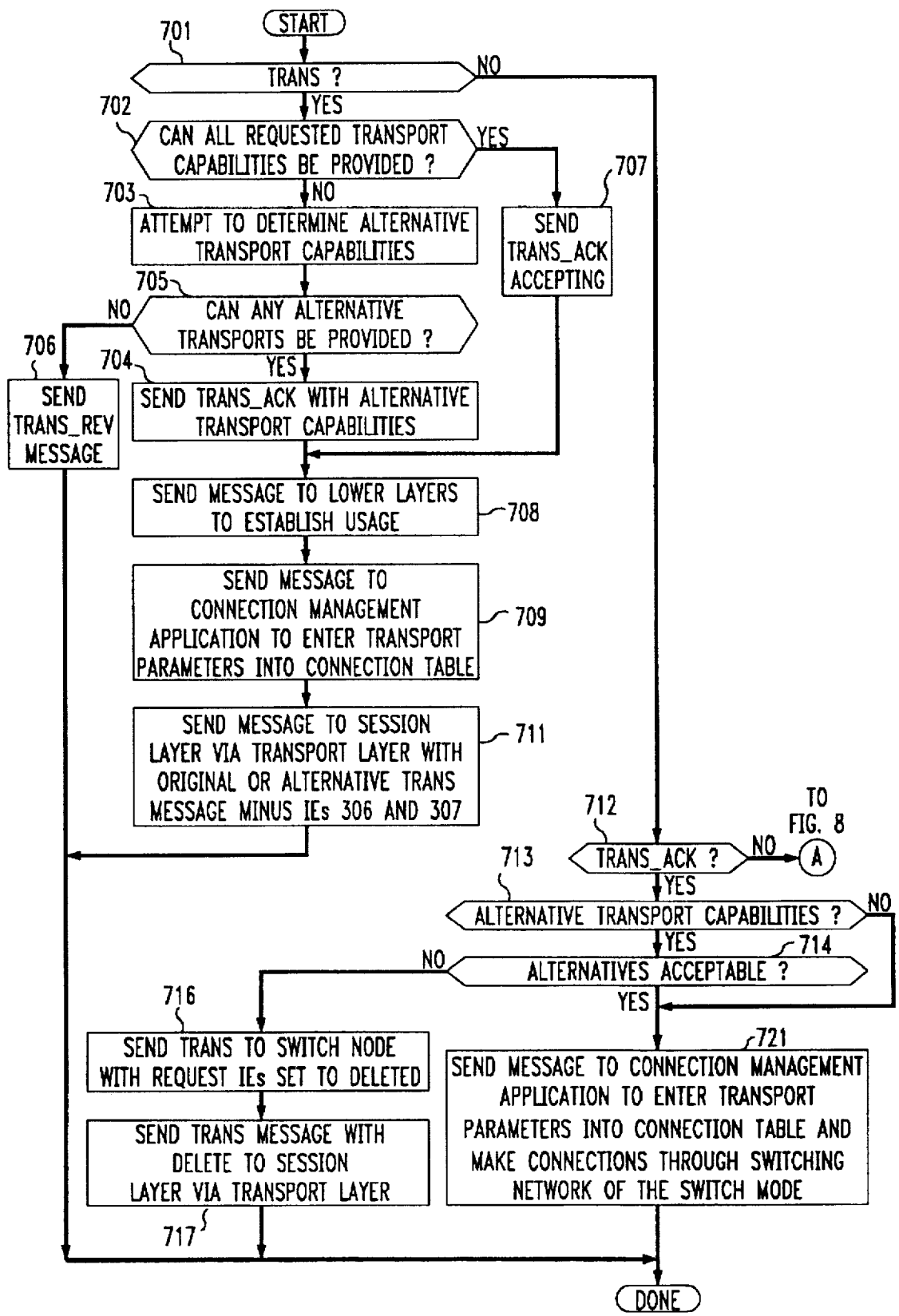
FIGS. 7, 8, and 9 illustrate, in flow chart form, the response of a network layer to the transport messages.
Figure 8:
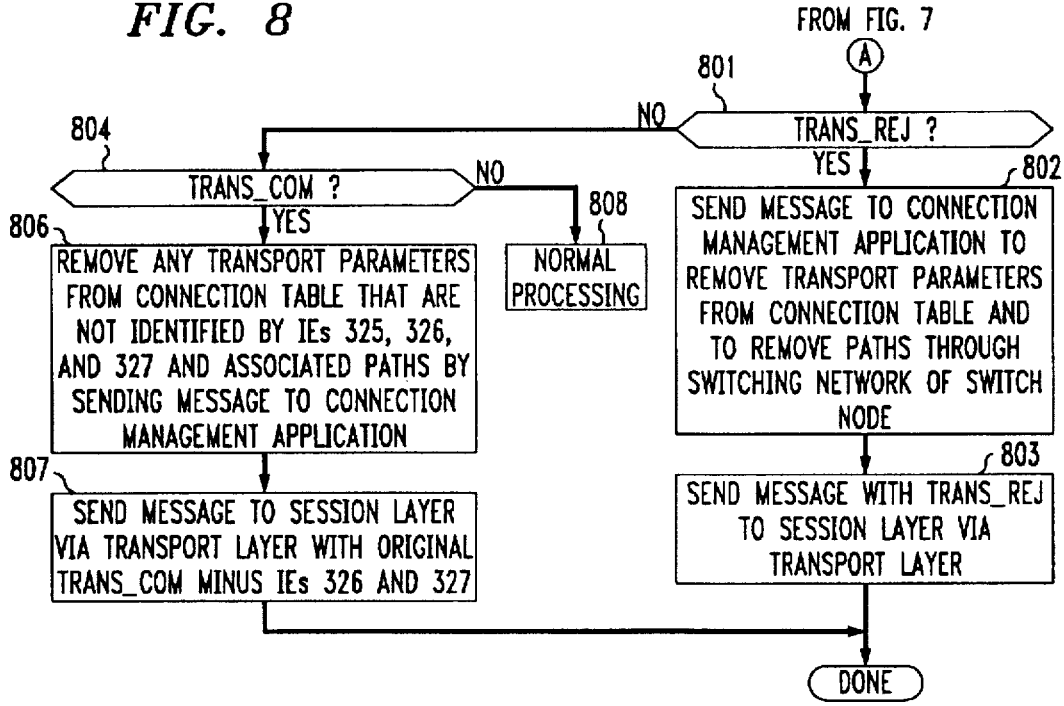
Figure 9:
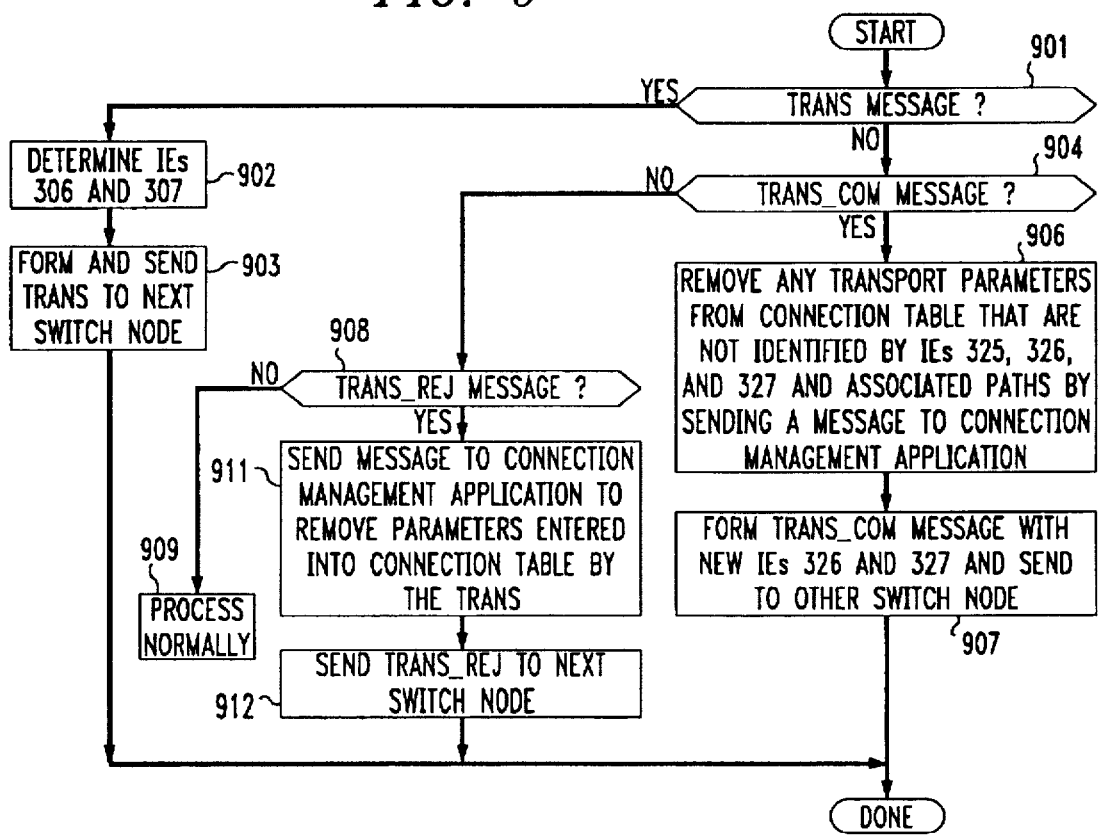

FIGS. 7, 8, and 9 illustrate, in flowchart form, the operations performed by network software layer 404 in implementing the transport messages illustrated in FIG. 3. Network software layer 404 performs the majority of the work in implementing the transport messages. FIGS. 7 and 8 illustrate the responses of network layer 404 upon receiving a transport message from another switching node. FIG. 9 illustrates the responses of network software layer 404 upon receiving a transport message from the session layer 406. The convention used in these figures is that that transport messages being received or sent to another switch node are identified only by their message code, e.g., TRANS. On the other hand, transport messages being relayed by session software layer 406 from the other half of the call are designated by the message code and the word "message", e.g., TRANS message.

Decision block 701 of FIG. 7 determines whether a TRANS message has been received from another switch node. In the previous example, switch node 102 receives a TRANS message via interface 551 from communication terminal 101. If the answer in decision block 701 is yes, decision block 702 determines whether the requested transport capabilities that are defined by bearer capability IEs 305, channel identification IEs 306, and data link identification IEs 307 can be provided. If the transport capabilities can be provided, block 707 is executed which sends back a TRANS_ACK message that contains no IEs 315, 316, and 317. If the answer in decision block 702 is no, block 703 attempts to determine an alternative transport capability. If none of the transport capabilities can be provided, a TRANS_REJ message is sent and all further processing is terminated. If at least one original or alternative transport capability can be provided, a TRANS_ACJ message is returned with the modified list of transport capabilities. Next, block 709 sends a message to the connection management application at applications layer 409 requesting that the transport parameters as defined by the new transport capabilities be entered into connection table 608. The transport parameters entered are either those of the originally requested transport capabilities or the alternative transport capabilities or the resulting combination of the two. Finally, block 711 sends a TRANS message to session layer 406 via transport layer 405 which is the original TRANS message and/or alternative transport capabilities minus IEs 306 and 307. IEs 306 and 307 are unique to the left half of the call as illustrated in FIG. 6. Session software layer 406 is responsive to this message to identify the call record, to identify LDCN associated with the right half of the call, and to send the message down the right half of the call with the proper identification to network software layer 404.

Returning to decision block 701, if the answer is no, control is transferred to decision block 712 which determines if a TRANS_ACK message was received from another switch node. In the previous example, a TRANS_ACK message was received by switch node 102 from switch node 103 on interface 552. This TRANS_ACK message was received by the right half of the call. If the answer in decision block 712 is yes, control is transferred to decision block 713. The latter decision block determines if there are alternative transport capabilities in the transport acknowledge message. If the answer is yes, control is transferred to decision block 714 which determines if the alternative transport capabilities are acceptable, i.e., the switch node can provide the alternative transport capabilities. If the answer in decision block 714 is no, block 716 is executed which sends a TRANS message to the other switch node with a request to delete any transport capabilities that are not acceptable. Next, block 717 sends a TRANS message with the same delete request included to session software layer 406 via transport layer 405. Session layer 406 is responsive to that message to transport the message down the left half of the call to network software layer 404. Note, that the transport parameters are only inserted into the connection record and paths established within a switch node upon reception of an acceptable TRANS_ACK message.

Returning to decision blocks 713 and 714. If the answer in decision block 713 is no, or the answer in decision block 714 is yes, control is transferred to block 721 which sends a message to the connection management application to enter the transport parameters into the connection table and to make the connections through the internal switching network of the switch node.

Returning to decision block 712, if the message is not a TRANS_ACK message, control is transferred to decision block 801 of FIG. 8 which determines if the message is a TRANS_REJ message. If the answer in decision block 801 is yes, block 802 sends a message to the connection management application to remove the transport parameters from the connection table and to remove any paths having been set up for those transport parameters through the switching network of the switch node. Note, that there may not be any work for the connection management application to do if the TRANS_REJ message is received in place of a TRANS_ACK. After execution of block 802, block 803 sets a message containing the TRANS_REJ message to session layer 406 via transport layer 405. Session software layer 406 sends this message down the left half of the call with the proper call record and LDCN identification information to network software layer 404.

If the answer in decision block 801 is no, control is transferred to decision block 804 which determines if the message is a TRANS_COM message. If the answer is no, control is transferred to block 808 which provides normal processing. Block 808 handles the standard ISDN messages. If the answer is yes in decision block 804, block 806 determines which transport parameters that are in connection table 608 are not identified by the bearer capability IEs 325, channel identification IEs 326, and data link identification IEs 327. After identifying these transport parameters, block 806 transmits a message to the connection management application to remove these transport parameters and any associated paths. Finally, block 807 sends a message to session software layer 406 via transport software layer 405 that contains the original TRANS_COM minus the channel identification IE 326 and the data link identification IE 327. Session software layer 406 is responsive to that message communicated down the left half of the call to network software layer 404 with the call record and LDCN identification information.

FIG. 9 illustrates the operations performed by network software layer 404 in response to transport messages being received from session software layer 406. Decision block 901 determines if the message is a TRANS message. In the previous example, the right half of the call illustrated in FIG. 6 receives a TRANS message from session software layer 406 after the left half of the call had received that message from communication terminal 101 via interface 551. If the answer is yes in decision block 901, control is transferred to block 902. Block 902 is responsive to the bearer capability IEs 305 to determine what the new channel identification IE 306 and data link identification IEs 307 should be for the TRANS message that will be transmitted to the next switch node. After this determination is made, block 903 forms and sends the new TRANS message to the next switch node. Note, that elements 301, 302, 303, 304, 305, and 308, 309, and 341 are simply repeated in the new TRANS message.

If the answer in decision block 901 was no, decision block 904 determines if the message received from session software layer 406 is a TRANS_COM message. If the answer in decision block 904 is yes, decision block 906 determines the transport parameters that are in connection table 608 that are not identified in bearer capability IEs 325, channel identification IEs 3216, and data link identification IE 327. After determining these transport parameters, block 906 transmits a message to the connection management application requesting that these transport parameters be removed from the connection table 608 and that all associated paths be removed. Next, block 907 forms a TRANS_COM message with new channel identification IEs 326 and data link identification IEs 327 that define the transport capabilities on the left half of the call. Block 907 then sends the formed TRANS_COM message to the other switch node.

If the answer in decision block 904 is no, control is transferred to decision block 908 which determines if a TRANS_REJ message was received from session software layer 406. If the answer is no, control is transferred to block 909 for normal processing of standard ISDN messages. If the answer in decision block 908 is yes, block 911 sends a message to the connection management application to remove all parameters entered into connection table 608 by the associated TRANS message. Finally, block 912 sends a TRANS_REJ message to the next switch node. In the previous example, block 912 sends the TRANS_REJ message from switch node 102 to communication terminal 101.

Figure 10:
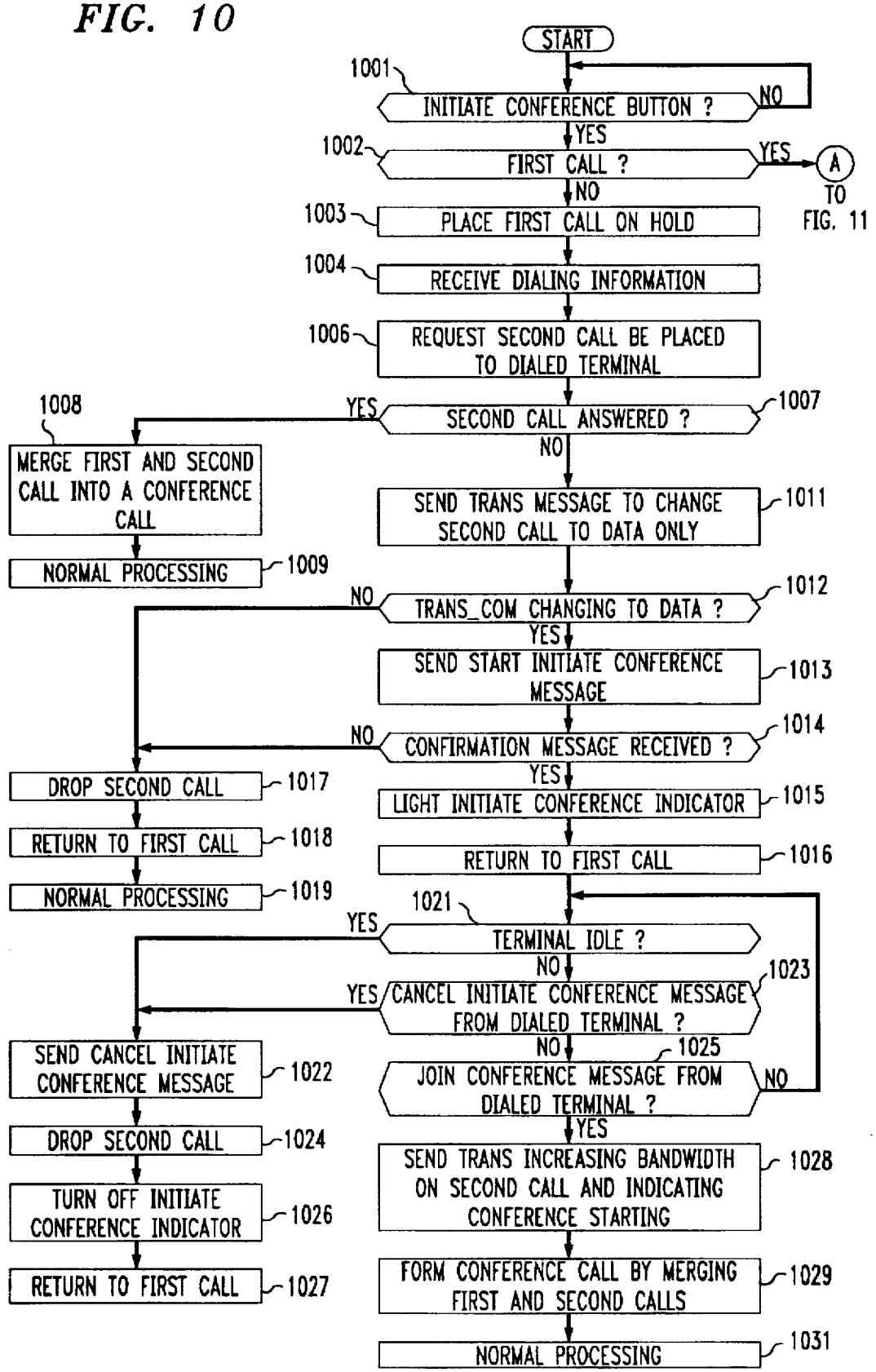
FIGS. 10 and 11 illustrate, in flow chart form, operations performed by an initiating communication terminal.
Figure 11:
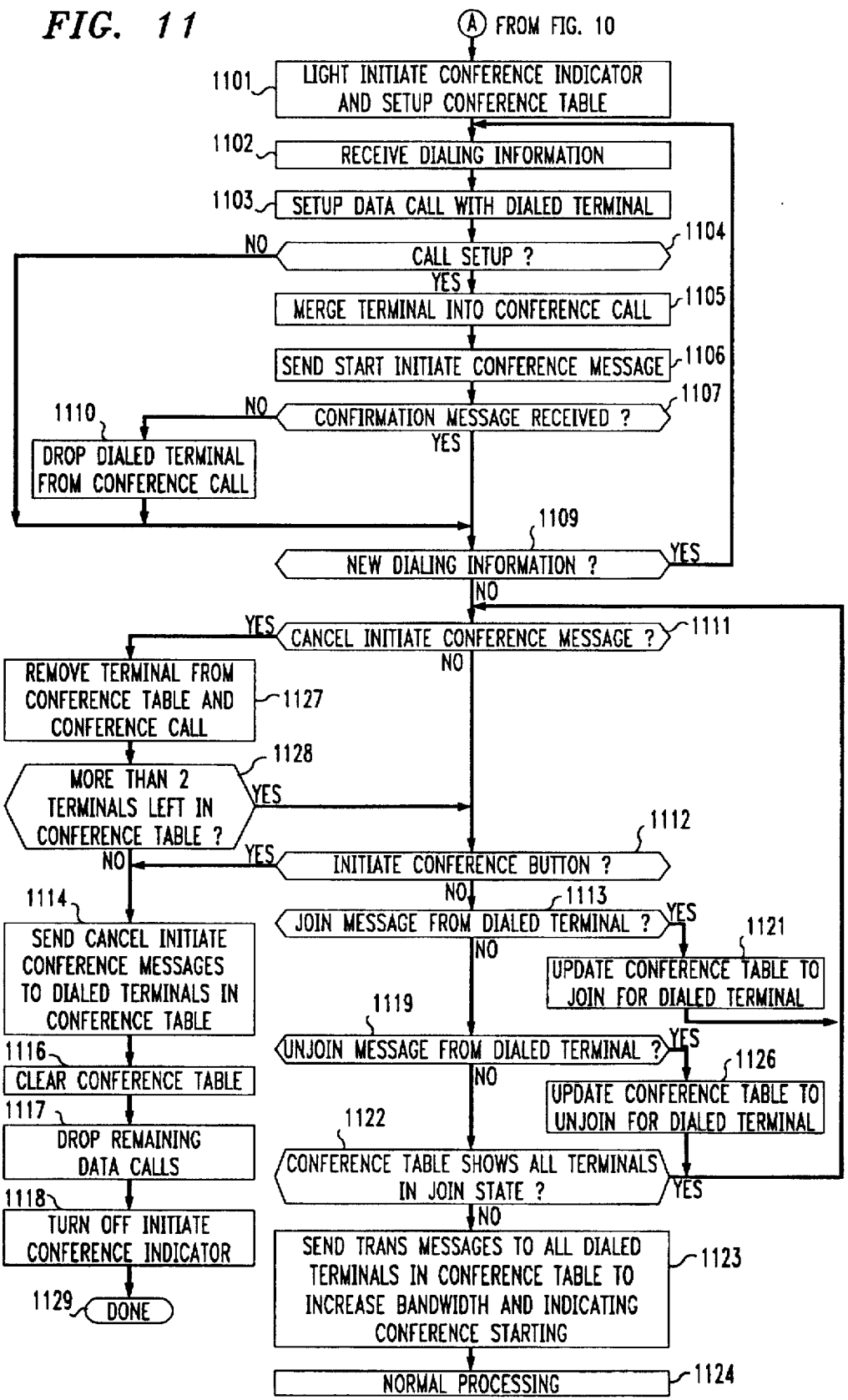
Figures 12, 20:
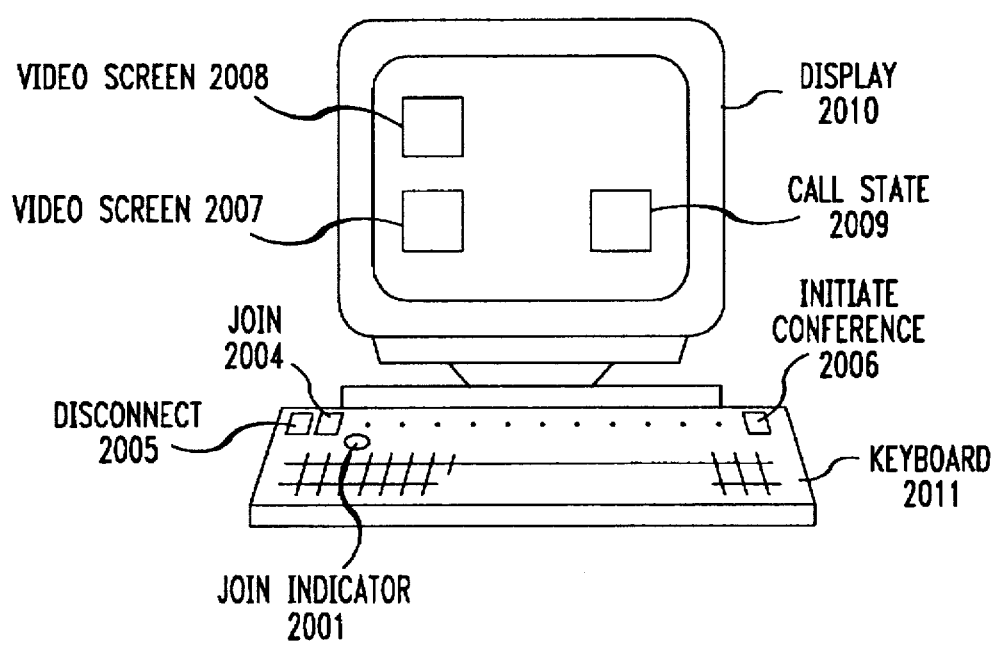
FIG. 12 illustrates a conference table.
FIG. 20 illustrates a communication terminal in accordance with the inventive concepts.

FIGS. 10 and 11 illustrate the operations performed by a communication terminal in initiating a conference. FIG. 12 illustrates the conference table maintained by the initiating communication terminal. Decision block 1001 determines if the initiate conference button has been activated on the communication terminal. If the answer is yes, decision block 1002 determines if this is the first call of the conference call. If the answer is yes in decision block 1002, control is transferred to blocks 1101–1129 that control the initiation of a conference call as described in the second example. If the answer in decision block 1002 is no, then, the communication terminal is engaged in a call with another communication terminal and wishes to add a third communication terminal into a conference call with the second communication terminal. This situation was described as the first example. If the answer in decision block 1002 is yes, block 1003 places the first call on hold, and block 1004 receives dialing information from the user of the communication terminal. Decision block 1006 then requests that a second call be placed to the dialed terminal. Decision block 1007 determines if the second call has answered in a manner indicating that the user of the dialed communication terminal wish to engage in the conference call at this time. If the answer is yes in decision block 1007, control is transferred to block 1008 which merges the first and second call into a conference call. In the first example, communication terminal 101, in executing block 1008, transmits a merge message to switch node 102. The merge message requested that the first and second calls be conferenced together in switch node 102. A more detailed description of the merge operation is set forth with respect to FIGS. 14 and 15. From that point on, block 1009 provides normal call processing.

Returning to decision block 1007, if the answer is no, this means that the user of the dialed communication terminal does not wish to engage fully in a conference call at this time. Block 1011 sends a TRANS message to change the second call to a low speed logical data link call and transfers control to decision block 1012. The latter decision block waits for receipt of a TRANS_COM (transport complete message) from the dialed communication terminal. If no TRAN_COM message is received, control is transferred to block 1017 which drops the second call, and block 1018 returns to the first call. Block 1019 then provides normal call processing. Returning to decision block 1012, if the answer is yes, control is transferred to block 1013 which sends a start initiate conference message to the dialed terminal. Block 1014 checks if a confirmation message is received to the message transmitted in block 1013. If the answer is no in decision block 1014, control is transferred to blocks 1017 through 1019. If the answer is yes in decision block 1014, control is transferred to block 1015 which lights the initiate conference indicator on the communication terminal. Next, control is transferred to block 1016 which returns the communication terminal to the first call.

Blocks 1021 through 1031 determine when the conference call is to be set up between the three communication terminals or when the initiate feature is to be abandoned.

Decision block 1021 determines when the communication terminal initiating the conference is idle. If the communication terminal initiating the call becomes idle, then all calls are dropped. Block 1022 sends a cancel initiate conference message to the dialed communication terminal. Block 1024 drops the second call, and block 1026 turns off the initiate conference indicator. Block 1027 returns to the first call, however since the initiating communication terminal has become idle, the first call will also be dropped.

Returning to decision block 1021, if the answer is no, control is transferred to decision block 1023 which determines if a cancel initiate conference message has been received from the dialed communication terminal. If the answer is yes, control is transferred to blocks 1022 through 1027 which function was previously described. Note, block 1027 returns the initiating communication terminal to the first call which may continue. If the answer in decision block 1023 is no, decision block 1025 determines if a join conference message was received from the dialed communication terminal. If the answer is no, control is returned to decision block 1021. If the answer in decision block 1025 is yes, block 1028 sends a TRANS message to increase the bandwidth of a second call and within this message indicates that the conference is starting. Block 1029 then forms a conference call by merging the first and second calls. Block 1031 the performs normal call processing.

Returning to decision block 1002, if the answer is yes in decision block 1002, this means that the user of the initiating communication terminal wishes to have a communication conference call established when all parties are prepared to fully participate. Block 1101 lights the initiate conference indicator on the initiating communication terminal and sets up the conference table illustrated in FIG. 12. Block 1102 receives the dialing information in turn for each of the communication terminals that will be part of the conference. Block 1103 sets up a data call with the dialed terminal. If the call is set up as determined by decision block 1104, block 1105 merges that communication terminal into the conference call. If the call is not set up, decision block 1104 transfers control to block 1109 which waits for new dialing information for the next communication terminal. If the answer in decision block 1104 is yes, block 1105 merges the communication terminal to the conference that is being formed and transfers control to block 1106. The latter block sends a start initiate conference message to the communication terminal just added to the conference call. Decision block 1107 then determines if a confirmation message is received back. If the answer is no, block 1110 drops the dialed communication terminal from the communication conference call and transfers control to decision block 1109. If the answer in decision block 1107 is yes, the dialed terminal is added to the conference table illustrated in FIG. 12. Note, that the conference call is not dropped by block 1110 but rather the dialed communication terminal is dropped from the conference call.

Returning to decision block 1109, if no new dialing information is received from the initiating communication terminal, control is transferred to decision block 1111 which determines if a cancel initiate conference message has been received from one of the communication terminals listed in the conference table of FIG. 12. If the answer is yes, block 1127 removes that communication terminal from the conference table and from the conference call. Decision block 1128 then determines if there are more than two communication terminals left in the conference table of FIG. 12. If the answer is no, control is transferred to block 1114 which sends cancel initiate conference messages to each of the dialed communication terminals listed in the conference table. Block 1116 clears the conference table, block 1117 drops all remaining data calls and block 1118 turns off the initiate conference indicator on the initiating communication terminal. Returning to decision block 1128, if the answer is yes, control is transferred to decision block 1112. If the answer in decision block 1111 is no, control is also transferred to decision block 1112.

Decision block 1112 determines if the initiate conference button on the initiating communication terminal has been pushed a second time indicating that the initiate conference feature is to be terminated. If the answer is yes, control is transferred to block 1114, and the operations of blocks 1114 through 1118 were described in the previous paragraph. If the answer in decision block 1112 is no, control is transferred to decision block 1113 to determine if a join message had been received from any of the dial communication terminals. If the answer is yes, block 1121 updates the conference table to show that this terminal is in the joined state and transfers control back to decision block 1111. If the answer in decision block 1113 is no, decision block 1119 determines if an unjoin message has been received from one of the dialed communication terminal. If the answer is yes, block 1126 updates the conference table to mark the state of this communication terminal as unjoin. If the answer in decision block 1119 is no, control is transferred to decision block 1122 which determines if the conference table shows that all terminals are in the join state. If the answer is no, control is transferred back to decision block 1111. If the answer in decision block 1122 is yes, block 1123 sends TRANS messages to all of the dialed communication terminals listed in the conference table to increase the bandwidth of the conference call to the point where all communication terminals can participate fully. The TRANS messages also indicate that the conference is starting. After execution of block 1123, block 1124 provides normal communication conference call processing.

Figure 13:
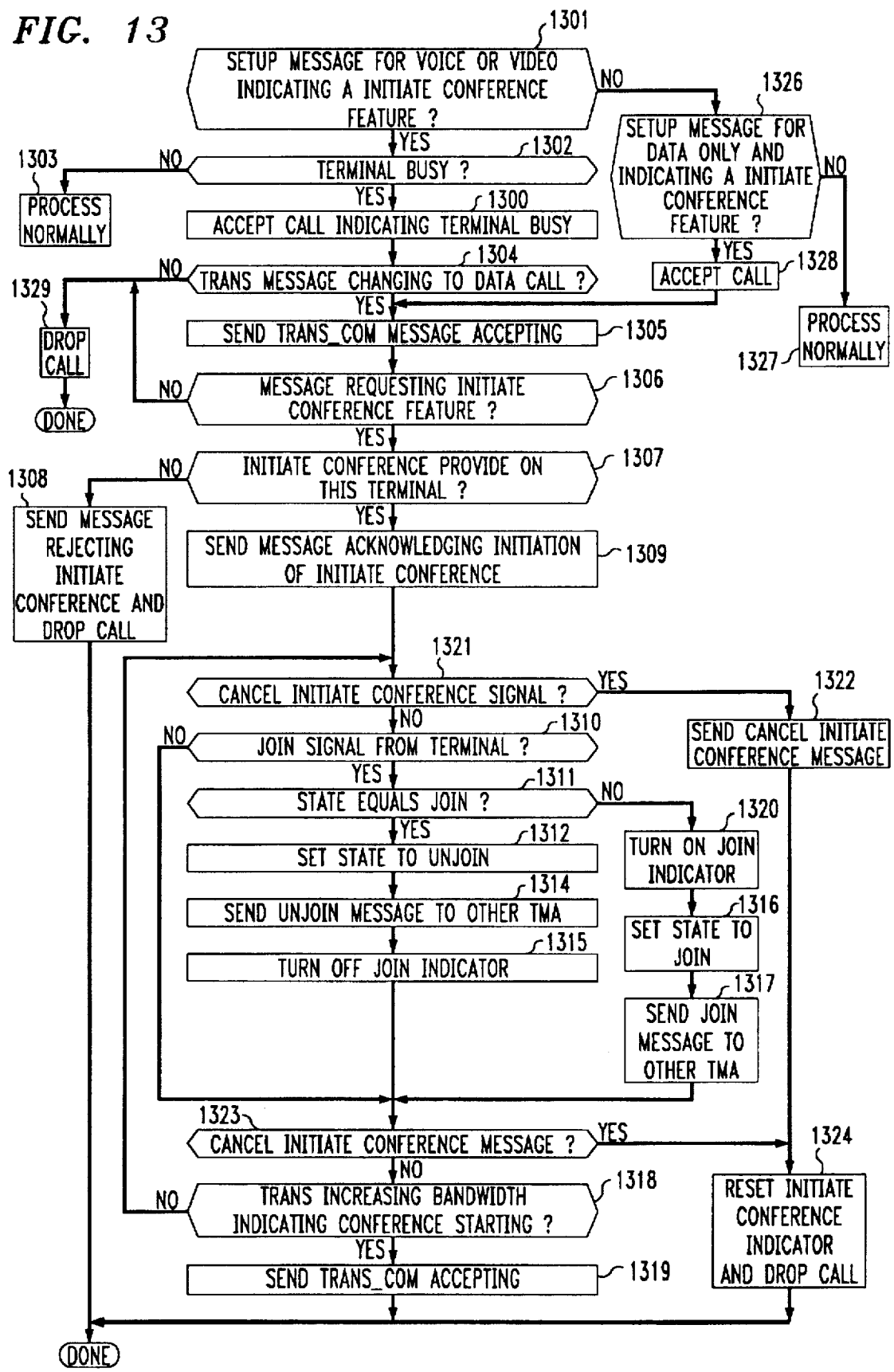
FIG. 13 illustrates, in flow chart form, operations performed by a communication terminal.

FIG. 13 illustrates the operations performed by a communication terminal that is being brought into a communication conference by an initiating communication terminal. Block 1301 determines if a setup message for voice and/or video indicating an initiate conference feature is in progress is received. One skilled in the art can readily see that additional media other than voice or video could be utilized in decision block 1301. If the answer is no in decision block 1301, decision block 1326 determines if the setup message is for data only and indicates an initiate conference feature is in progress. Such a message is sent out by block 1103 of FIG. 11. If the answer in decision block 1326 is yes, decision block 1328 accepts the call and transfers control to block 1305. If the answer in decision block 1326 is no, control is transferred to block 1327 for normal processing.

Returning to decision block 1301, if the answer is yes, decision block 1302 determines if the communication terminal is busy. if the answer is no, the conference call will be set up in the normal manner with the normal processing being done by block 1301. If the answer in decision block 1302 is yes, block 1300 accepts the call but indicates that the communication terminal is busy. Decision block 1304 then determines if a TRANS message is received that changes the call to a data call. Such a TRANS message would be transmitted by block 1011 of FIG. 10. If the answer is no, block 1329 which drops the call. If the answer in decision block 1304 is yes, control is transferred to block 1305 which sends back a TRANS_COM message accepting the change before transferring control to decision block 1306. The latter decision block determines if a requesting initiate conference feature message is received. If the answer is no, control is transferred to block 1329 and drops the call. If the answer in decision block 1306 is yes, control is transferred to decision block 1307 which determines if the initiate conference feature is provided on this communication terminal. If the answer is no, block 1308 sends a rejecting initiate conference message and drops the call. Returning to decision block 1307, if the answer is yes, block 1309 sends an acknowledging initiation of conference feature message and transfers control decision block 1321.

Block 1321 determines if a cancel initiate conference signal has been generated by the communication terminal executing the operations illustrated in FIG. 13. This message is generated in response to the user of the communication terminal actuating the initiate conference button. If the answer in decision block 1321 is yes, block 1322 sends a cancel initiate conference message to the initiate conference terminal and transfers control to block 1324. The latter block resets the initiate conference indicator and drops the call. If the answer in decision block 1321 is no, decision block 1310 determines if the join signal has been generated by the communication terminal. The join signal is generated by actuation of a join button. If the join indicator associated with the join button is off, this means that the communication terminal is in the unjoin state; and if the join indicator is on, this means that the communication terminal is in the join state. If the answer in decision block 1310 is no, control is transferred to decision block 1323. If the answer in decision block 1310 is yes, control is transferred to decision block 1311 which determines if the communication terminal is in the join state. If the answer is yes, block 1312 sets the state to unjoin and transfers control to block 1314. The latter block sends the unjoin message to the initiating communication terminal and transfers control to block 1315 which turns off the join indicator. Block 1315 then transfers control to decision block 1323. If the answer in decision block 1311 is no, block 1320 turns on the join indicator. Block 1316 then sets the state to join, and block 1317 sends a join message to the initiating communication terminal which is referenced here by the other TMA.

Regardless whether block 1315 or 1317 was executed, control is transferred to decision block 1323. The latter decision block determines if a cancel initiate conference message was received from the initiating communication terminal. If the answer is yes, control is transferred to block 1324 which resets the initiate conference indicator and drops the call. If the answer in decision block 1323 is no, decision block 1318 determines if a TRANS message was received increasing the bandwidth and indicating that a conferencing is starting. If the answer is no, control is transferred back to decision block 1321. If the answer in decision block 1318 is yes, block 1319 sends back a TRANS_COM message accepting the increase in bandwidth. As previously described, the communication conference call is now setup by the initiating communication terminal.

Figure 14:
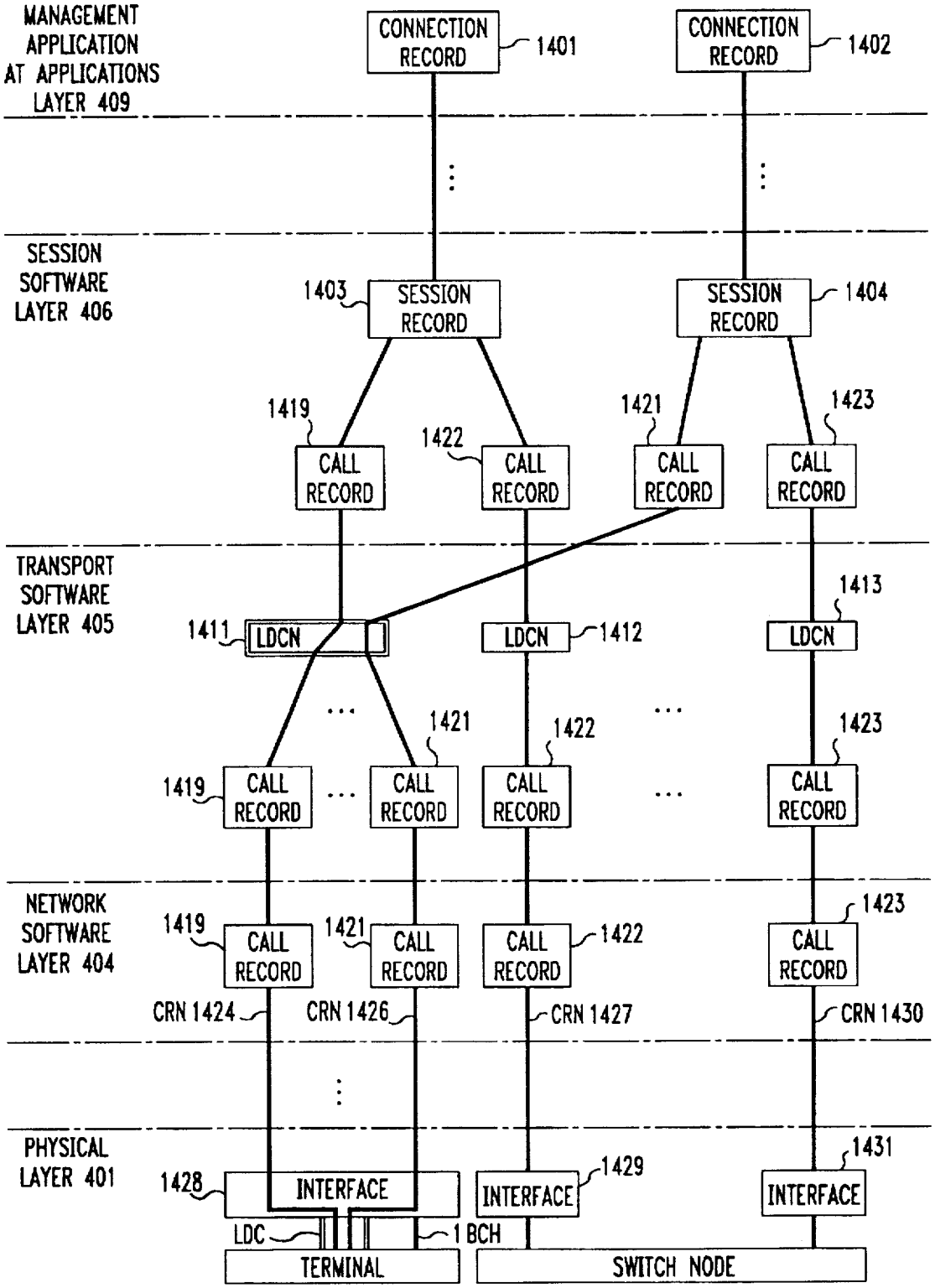
FIG. 14 illustrates the logical structure of two calls through the network, transport, session, and application software layers.

FIG. 14 illustrates the various records and logical control links for two calls terminated on terminal 101. Software layers 401 through 409 are being executed on a switch node 102 that interconnects terminal 101 to switch node 103. Interface 1428 terminates PRI link 111, and interfaces 1429 and 1431 terminate PRI links 112 and 116, respectively. As illustrated in FIG. 14, terminal 101 is engaged in two calls. One call is handled by session record 1403; while the second call is handled by session record 1404. The left half of the first call utilizes CRN 1424 and call record 1419; and the left half of the second call utilizes CRN 1426 and call record 1421. The right half of the first call terminates on interface 1429 and utilizes CRN 1427 and call record 1422. The right half of the second call terminates on interface 1431 and utilizes CRN 1430 and call record 1423. LDCN 1411 is shared by the left halfs of both calls. Connection record 1401 is used by the first call; and connection record 1402 is used by the second call.

Figure 15:
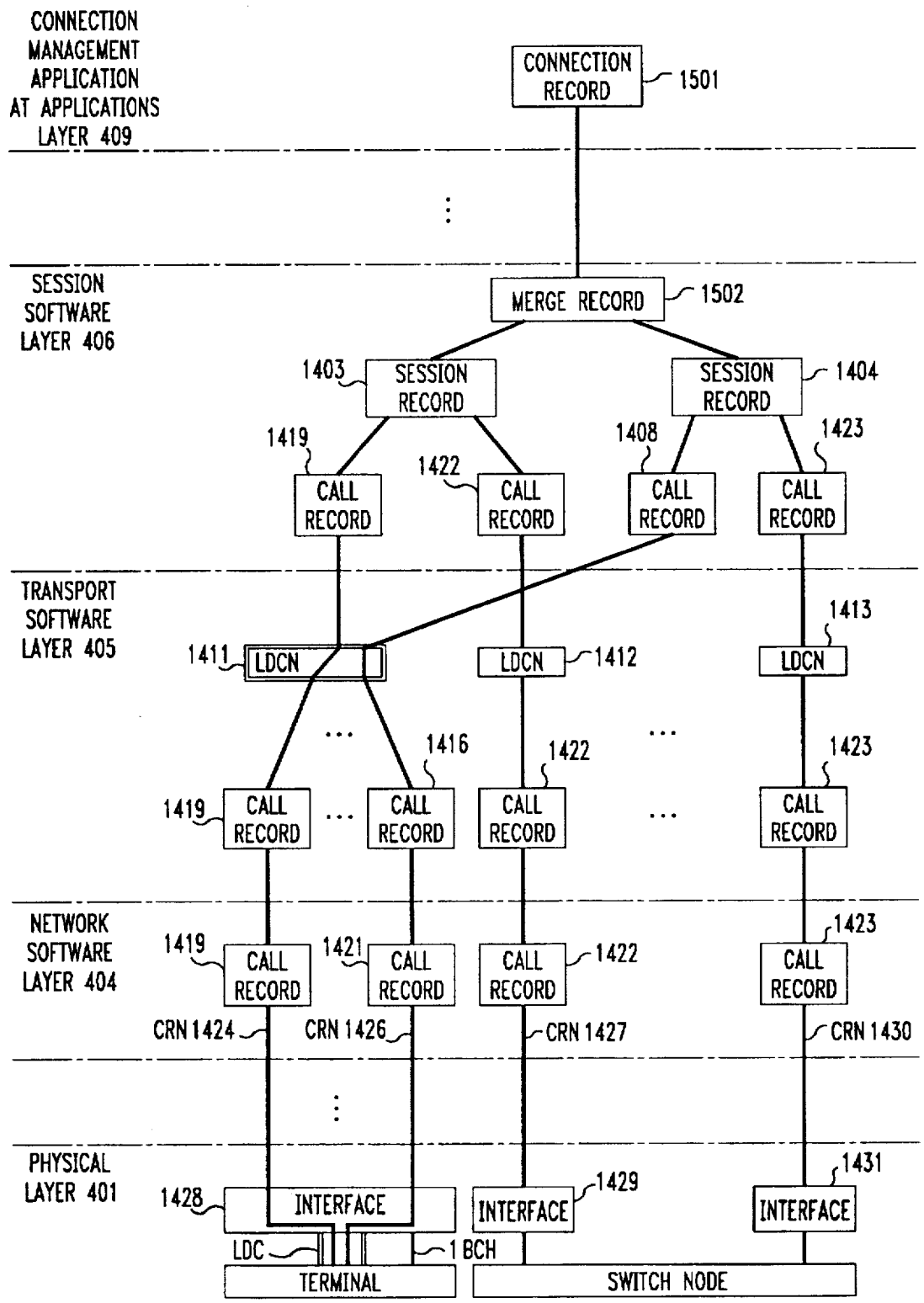
FIG. 15 illustrates the logical structure of conference call through the network, transport, session, and application software layers after a merge operation has been performed.

FIG. 15 illustrates the results of a merge message being transmitted from the terminal management application of terminal 101 to switch node 102. For the sake of example, it is assumed that the merge message is transmitted as a control message on the first call; hence, it is using CRN 1424. When network software layer 404 receives the merge message, it relays the merge message to the merge software module in session software layer 406. The merge module of the latter software layer is responsive to the merge message to determine that the call to be merged is identified by CRN 1426. In addition, the merge message identifies that the call to be merged with the call of CRN 1426 is identified by CRN 1424. The merge module in session software layer 406 utilizes CRNs 1424 and 1426 to identify session records 1403 and 1404 respectively. After identifying session records 1403 and 1404, the merge module in session software layer 406 creates merge record 1502. Merge record 1502 identifies all signal transports utilized by session records 1404 and 1403 that are to be physically merged into a single conference call.

After creating merge record 1502, the merge software module of session software layer 406 requests that the connection management application at applications layer 409 combine all of the access points (call destination points) identified by connection records 1401 and 1402 of FIG. 14 into a single call record. The connection manager is responsive to this request to merge connection records 1401 and 1402 into a new connection record designated as connection record 1501. The connection management application then controls the physical network so that a conference bridge is created that combines the voice information being received via the two right halfs of the first and second calls with voice information being received over a single B channel for the left halfs of the calls. Although the voice information has been combined over a single B channel to terminal 101, the control of the two calls is still transmitted to terminal 101 using CRN 1426 and CRN 1424. If the calls also used video, the connection manager would control the video network so that a video bridge was established for the conference call.

If the terminal management application of terminal 101 requests transmission of a TRANS message for the second call (which is identified by CRN 1426) to reduce the bandwidth from voice to low speed data, network software layer 404 is responsive to this TRANS message to perform the functions previously described with respect to FIG. 6. However, when a request is transmitted to the connection management application to remove the voice transport upon receipt of a TRANS_COM, the connection management application determines from connection record 1501 that the voice transport is still required for the first call. The connection management application however establishes the low speed data link that was requested by network software layer 404 in the TRANS message and acknowledged by the TRAN_COM message. The TRANS message is then transferred up to session software layer 406 and is identified by session record 1404. Session software layer 406 then transmits the TRANS message down the right half of the second call by using call record 1423 and CRN 1430. Network software layer 404 is responsive to the TRANS message being received from session software layer 406 to process this message as was previously described with respect to FIG. 6.

If the terminal management application of terminal 101 requests transmission of a TRANS message for the second call (which is identified by CRN 1426) to change the bandwidth on the second call from low speed data to voice, network software layer 404 is responsive to this TRANS message to perform the functions previously described with respect to FIG. 6. Upon receipt of a TRANS_COM message, the terminal management application requests that the connection management application add the voice transport to the call and remove the low speed data. The connection management application determines from connection record 1501 that the voice transport must be combined into the conference call that is presently taking place and controls the physical network and the conference bridge to accomplish this. In addition, the connection management application controls the lower software layers to remove the low speed data link. As before, if video transport was being added to the conference call, the connection management application also controls the video network and the video conference bridge to place the second call into the conference.

Figure 16:
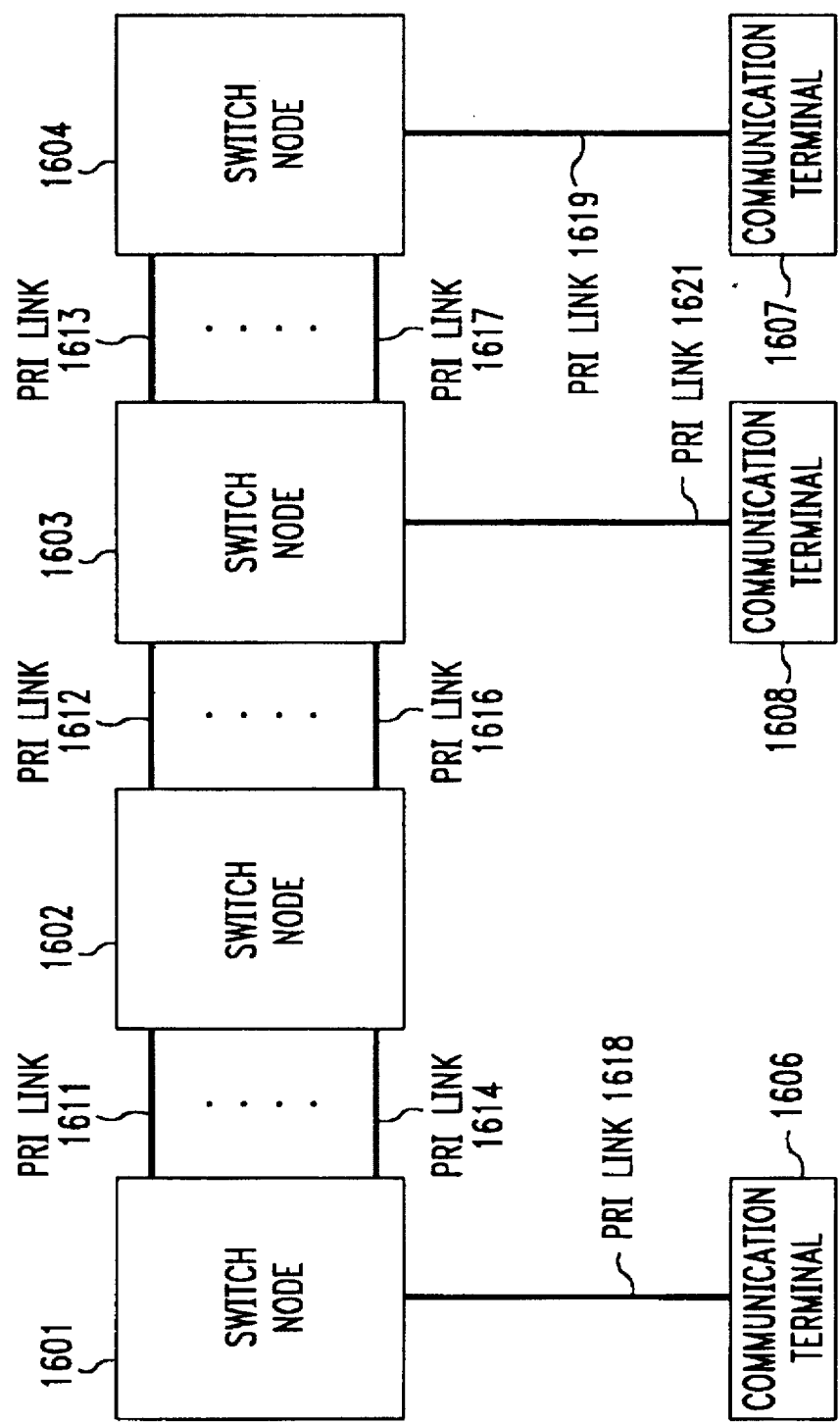
FIG. 16 illustrates a second embodiment of a system for implementing the inventive concepts.

FIG. 16 illustrates a second embodiment of the invention. In FIG. 16, the initiation of the conference is controlled by a terminal management application being executed by the switch node to which the initiating communication terminal is connected by a PRI link. The manner in which the initiate conference feature is performed with respect to the two previous examples is similar between FIGS. 1 and 16 with the major exception being that communication terminal 1606, 1607, and 1608 perform the operations described for communication terminals 101, 104, and 106, respectively. In addition, the major control functions are performed within the switch nodes to which communication terminals 1606, 1607, and 1608 are connected.

Figure 17:
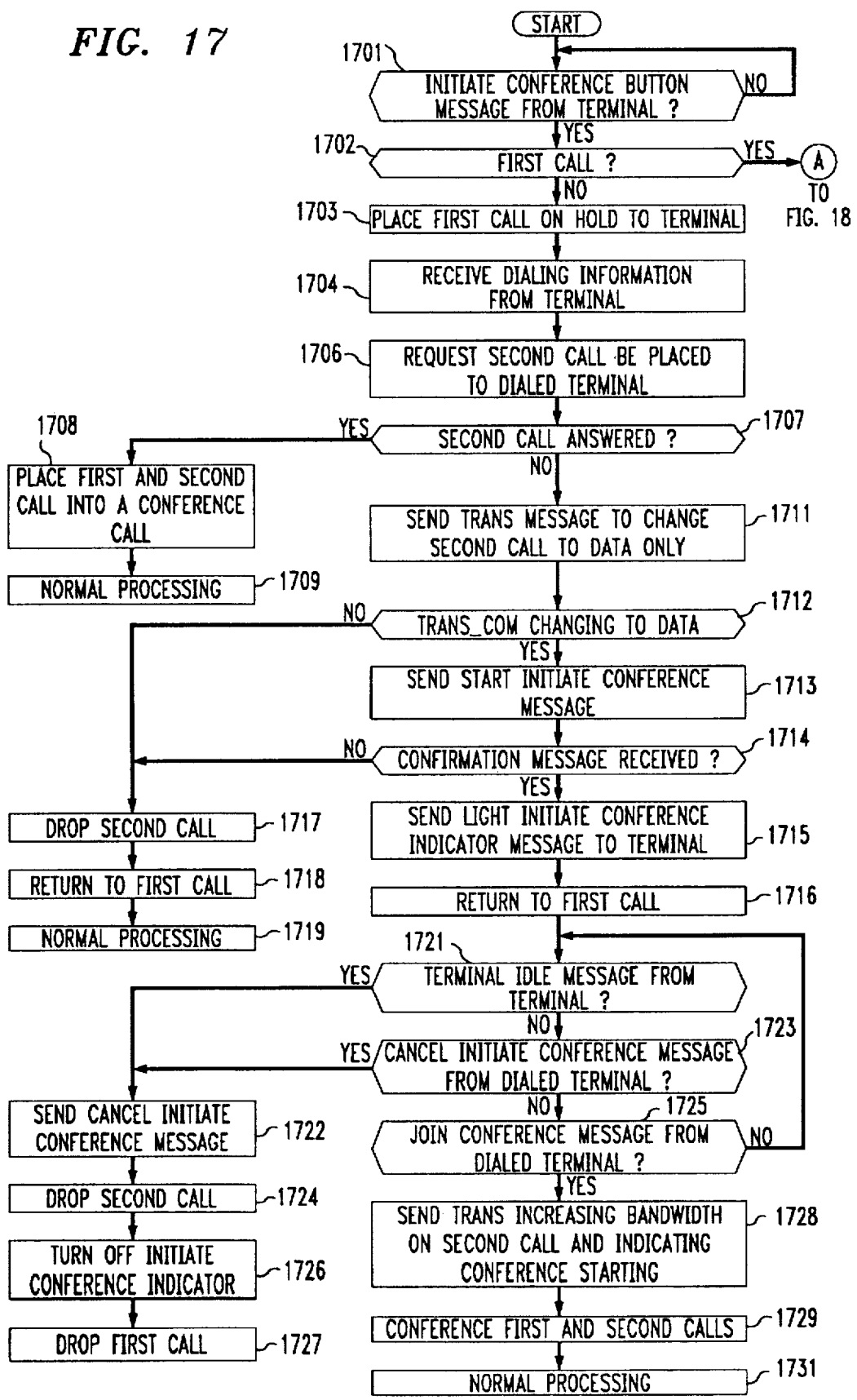
FIGS. 17 and 18 illustrate, in flow chart form, operations performed by a switch node connected to an initiating communication terminal.
Figure 18:
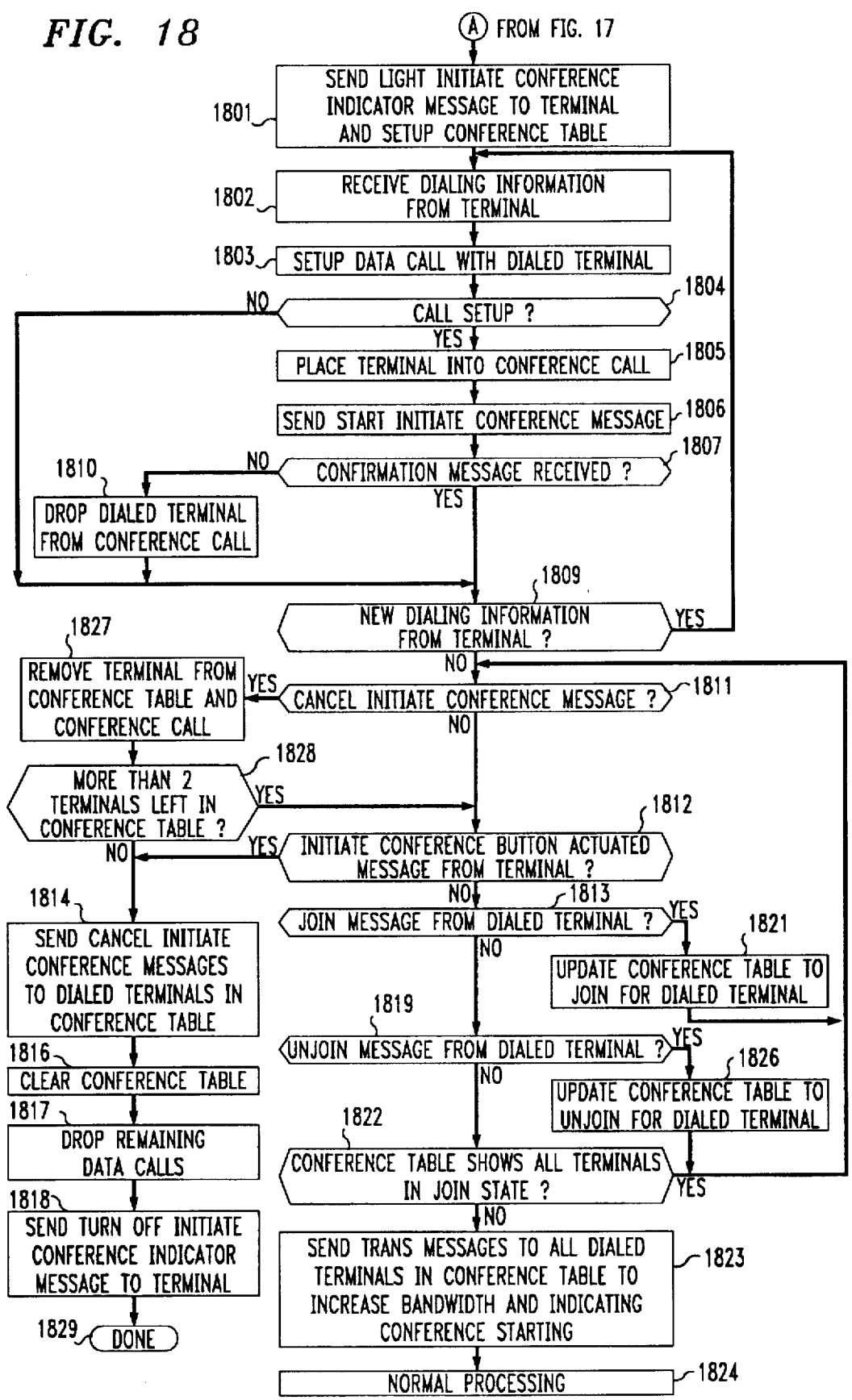

FIGS. 17, 18, and 19 disclose the operations performed by terminal management applications executing in switch nodes 1601, 1603, and 1604. FIGS. 17 and 18 illustrate the operations performed for a communication terminal that is initiating a conference. FIG. 12 illustrates the conference table maintained by the initiating communication terminal. Decision block 1701 determines if an initiate conference button actuation message has been received on the communication terminal. If the answer is yes, decision block 1702 determines if this is the first call of the conference call. If the answer is yes in decision block 1702, control is transferred to blocks 1801–1829 that control the initiation of a conference call as described in the second example. If the answer in decision block 1702 is no, then, the communication terminal is engaged in a call with another communication terminal and wishes to add a third communication terminal into a conference call with the second communication terminal. This situation was described as the first example. If the answer in decision block 1702 is yes, block 1703 places the first call on hold to the communication terminal, and block 1704 receives dialing information from the communication terminal as inputed by the user. Decision block 1706 then requests that a second call be placed to the dialed terminal. Decision block 1707 determines if the second call has answered in a manner indicating that the user of the dialed communication terminal wish to engage in the conference call at this time. If the answer is yes in decision block 1707, control is transferred to block 1708 which conferences the first and second call into a conference call. In the first example, communication terminal 101, in executing block 1708, transmits a merge message to switch node 102. The merge message requested that the first and second calls be conferenced together in switch node 102. With respect to FIG. 17, communication terminal 101 requests that switch node 102 conference the two calls together. From that point on, block 1709 provides normal call processing.

Returning to decision block 1707, if the answer is no, this means that the user of the dialed communication terminal does not wish to engage fully in a conference call at this time. Block 1711 sends a TRANS message to change the second call to a low speed logical data link call and transfers control to decision block 1712. The latter decision block waits for receipt of a TRANS_COM (transport complete message) from the switch node to which the dialed communication terminal is connected. If no TRAN_COM message is received, control is transferred to block 1717 which drops the second call, and block 1718 returns the communication terminal to the first call. Block 1719 then provides normal call processing. Returning to decision block 1712, if the answer is yes, control is transferred to block 1713 which sends a start initiate conference message to the switch node to which the dialed terminal is connected. Block 1714 checks if a confirmation message is received to the message transmitted in block 1713. If the answer is no in decision block 1714, control is transferred to blocks 1717 through 1719. If the answer is yes in decision block 1714, control is transferred to block 1715 which sends a message to light the initiate conference indicator on the communication terminal. Next, control is transferred to block 1716 which returns the communication terminal to the first call.

Blocks 1721 through 1731 determine when the conference call is to be set up between the three communication terminals or when the initiate feature is to be abandoned. Decision block 1721 determines when the communication terminal initiating the conference is idle. If the communication terminal initiating the call becomes idle, then all calls are dropped. Block 1722 sends a cancel initiate conference message to the dialed communication terminal. Block 1724 drops the second call, and block 1726 turns off the initiate conference indicator. Block 1727 returns to the first call, however since the initiating communication terminal has become idle, the first call will also be dropped.

Returning to decision block 1721, if the answer is no, control is transferred to decision block 1723 which determines if a cancel initiate conference message has been received from the dialed communication terminal. If the answer is yes, control is transferred to blocks 1722 through 1727 which function was previously described. Note, block 1727 returns the initiating communication terminal to the first call which may continue. If the answer in decision block 1723 is no, decision block 1725 determines if a join conference message was received from the switch node to which the dialed communication terminal is connected. If the answer is no, control is returned to decision block 1721. If the answer in decision block 1725 is yes, block 1728 sends a TRANS message to increase the bandwidth of a second call and within this message indicates that the conference is starting. Block 1729 then forms a conference call by conferencing the first and second calls. Block 1731 the performs normal call processing.

Returning to decision block 1702, if the answer is no in decision block 1702, this means that the user of the initiating communication terminal wishes to have a communication conference call established when all parties are prepared to fully participate. Block 1801 sends a light initiate conference indicator message to the initiating communication terminal and sets up the conference table illustrated in FIG. 12. Block 1802 receives the dialing information in turn for each of the communication terminals that will be part of the conference. Block 1803 sets up a data call with the switch node to which the dialed terminal is connected. If the call is set up as determined by decision block 1804, block 1805 conferences that communication terminal into the conference call. If the call is not set up, decision block 1804 transfers control to block 1809 which waits for new dialing information for the next communication terminal. If the answer in decision block 1804 is yes, block 1805 conferences the communication terminal to the conference that is being formed and transfers control to block 1806. The latter block sends a start initiate conference message to the switch node to which the communication terminal just added to the conference call is connected. Decision block 1807 then determines if a confirmation message is received back. If the answer is no, block 1810 drops the dialed communication terminal from the communication conference call and transfers control to decision block 1809. If the answer in decision block 1807 is yes, the dialed terminal is added to the conference table illustrated in FIG. 12. Note, that the conference call is not dropped by block 1810 but rather the dialed communication terminal is dropped from the conference call.

Returning to decision block 1809, if no new dialing information is received from the initiating communication terminal, control is transferred to decision block 1811 which determines if a cancel initiate conference message has been received from one of the communication terminals listed in the conference table of FIG. 12. If the answer is yes, block 1827 removes that communication terminal from the conference table and from the conference call. Decision block 1828 then determines if there are more than two communication terminals left in the conference table of FIG. 12. If the answer is no, control is transferred to block 1814 which sends cancel initiate conference messages to each of the dialed communication terminals listed in the conference table. Block 1816 clears the conference table, block 1817 drops all remaining data calls and block 1818 sends a turn off initiate conference indicator message to the initiating communication terminal. Returning to decision block 1828, if the answer is yes, control is transferred to decision block 1812. If the answer in decision block 1811 is no, control is also transferred to decision block 1812.

Decision block 1812 determines if the initiate conference button on the initiating communication terminal has been pushed a second time indicating that the initiate conference feature is to be terminated. If the answer is yes, control is transferred to block 1814, and the operations of blocks 1814 through 1818 were described in the previous paragraph. If the answer in decision block 1812 is no, control is transferred to decision block 1813 to determine if a join message had been received from any of the dial communication terminals. If the answer is yes, block 1821 updates the conference table to show that this terminal is in the joined state and transfers control back to decision block 1811. If the answer in decision block 1813 is no, decision block 1819 determines if an unjoin message has been received from one of the dialed communication terminal. If the answer is yes, block 1826 updates the conference table to mark the state of this communication terminal as unjoin. If the answer in decision block 1819 is no, control is transferred to decision block 1822 which determines if the conference table shows that all terminals are in the join state. If the answer is no, control is transferred back to decision block 1811. If the answer in decision block 1822 is yes, block 1823 sends TRANS messages to switch nodes connected to all of the dialed communication terminals listed in the conference table to increase the bandwidth of the conference call to the point where all communication terminals can participate fully. The TRANS messages also indicate that the conference is starting. After execution of block 1823, block 1824 provides normal communication conference call processing.

FIG. 19 illustrates the operations performed by a switch node connected to a communication terminal that is being brought into a communication conference by an initiating communication terminal. Block 1901 determines if a setup message for voice and/or video indicating an initiate conference feature is in progress is received. One skilled in the art can readily see that additional media other than voice or video could be utilized in decision block 1901. If the answer is no in decision block 1901, decision block 1926 determines if the setup message is for data only and indicates an initiate conference feature is in progress. Such a message is sent out by block 1803 of FIG. 18. If the answer in decision block 1926 is yes, decision block 1928 accepts the call and transfers control to block 1905. If the answer in decision block 1926 is no, control is transferred to block 1927 for normal processing.

Returning to decision block 1901, if the answer is yes, decision block 1902 determines if the communication terminal is busy, if the answer is no, the conference call will be set up in the normal manner with the normal processing being done by block 1901. If the answer in decision block 1902 is yes, block 1900 accepts the call but indicates that the communication terminal is busy. Decision block 1904 then determines if a TRANS message is received that changes the call to a data call. Such a TRANS message would be transmitted by block 1711 of FIG. 17. If the answer is no, block 1929 which drops the call. If the answer in decision block 1904 is yes, control is transferred to block 1905 which sends back a TRANS_COM message accepting the change before transferring control to decision block 1906. The latter decision block determines if a requesting initiate conference feature message is received. If the answer is no, control is transferred to block 1929 and drops the call. If the answer in decision block 1906 is yes, control is transferred to decision block 1907 which determines if the initiate conference feature is provided for this communication terminal. If the answer is no, block 1908 sends a rejecting initiate conference message and drops the call. Returning to decision block 1907, if the answer is yes, block 1909 sends an acknowledging initiation of conference feature message and transfers control decision block 1921.

Block 1921 determines if a cancel initiate conference message has been received from the communication terminal connected to the switch node executing the operations illustrated in FIG. 19. This message is generated by the communication terminal in response to the user of the communication terminal actuating the initiate conference button. If the answer in decision block 1921 is yes, block 1922 sends a cancel initiate conference message to the switch node connected to the initiate conference communication terminal and transfers control to block 1924. The latter block sends a reset initiate conference indicator message to the terminal and drops the call. If the answer in decision block 1921 is no, decision block 1910 determines if the join message has been received from the communication terminal. The join message is generated by the communication terminal in response to actuation of a join button. If the join indicator associated with the join button is off, this means that the communication terminal is in the unjoin state; and if the join indicator is on, this means that the communication terminal is in the join state. If the answer in decision block 1910 is no, control is transferred to decision block 1923. If the answer in decision block 1910 is yes, control is transferred to decision block 1911 which determines if the communication terminal is in the join state. If the answer is yes, block 1912 sets the state to unjoin and transfers control to block 1914. The latter block sends the unjoin message to the initiating communication terminal and transfers control to block 1915 which sends a turn off join indicator message to the communication terminal. Block 1915 then transfers control to decision block 1923. If the answer in decision block 1911 is no, block 1920 sends a turn on join indicator message to the communication terminal. Block 1916 then sets the state to join, and block 1917 sends a join message to the switch node connected to the initiating communication terminal which is referenced here by the "other TMA".

Regardless whether block 1915 or 1917 was executed, control is transferred to decision block 1923. The latter decision block determines if a cancel initiate conference message was received from the initiating communication terminal. If the answer is yes, control is transferred to block 1924 which sends a reset initiate conference indicator message to the terminal and drops the call. If the answer in decision block 1923 is no, decision block 1918 determines if a TRANS message was received increasing the bandwidth and indicating that a conferencing is starting. If the answer is no, control is transferred back to decision block 1921. If the answer in decision block 1918 is yes, block 1919 sends back a TRANS_COM message accepting the increase in bandwidth. As previously described, the communication conference call is now setup by the switch node connected to the initiating communication terminal.

FIG. 20 illustrates a communication terminal suitable for use as communication terminals 1606, 1607, or 1608. Video screens 2007 and 2008 are intended to indicate a partitioning of display 2010 so as to allow each member of the multi-media conference to be displayed separately. As is well known in the art, there could be more video screens then two as illustrated in FIG. 20. The call state 2009 is intended to be utilized to display the various states and conditions of the multi-media conference call.

It is to be understood that the above-described embodiments are merely illustrative of the principles of the invention and that other arrangements may be devised by those skilled in the art without departing from the spirit or scope of the invention.

The invention claimed is:

1. A method for establishing a conference call so that the conference call is fully established upon all parties to the conference call being ready to fully participate in the conference call, the method comprising the steps of:

establishing a limited telecommunication bandwidth conference call to all designated telecommunication terminals by an initiating telecommunication terminal;

receiving a first message by the initiating telecommunication terminal from each of the designated telecommunication terminals when each of the designated telecommunication terminals is ready to fully participate in the conference call; and adjusting the telecommunication bandwidth of the conference call to allow full participation in the conference call by all telecommunication terminals by transmission of a second message to each of the designated telecommunication terminals for changing the telecommunication bandwidth by the initiating telecommunication terminal after all of the designated telecommunication terminals have transmitted the first message.

2. The method of claim 1 wherein the first message defines that the sending telecommunication terminal is idle.

3. The method of claim 1 wherein the first message defines that the user of the sending telecommunication terminal is ready to join the conference call.

4. The method of claim 1 wherein the step of adjusting comprises the step of providing voice communication between the telecommunication terminals.

5. The method of claim 1 wherein the step of adjusting comprises the step of providing video and voice communication between the telecommunication terminals.

6. The method of claim 1 wherein the step of adjusting comprises the step of providing data, video and voice communication between the telecommunication terminals.

7. The method of claim 1 wherein the conference call is established on communication paths through a switching system with each communication path connecting one of the designated telecommunication terminals to the initiating telecommunication terminal, and the switching system having a plurality of switch nodes and the step of adjusting comprises the steps, for each communication path, of receiving the second message via a signaling channel that is part of the communication path by a first one of the plurality of switch nodes;

determining a requested change in telecommunication bandwidth by the first one of the plurality of switch nodes from the second message;

modifying the communication bandwidth through the switch node to provide the requested communication bandwidth; and transmitting by the first one of the plurality of switch nodes the second message via the signaling channel to a next sequential one of the plurality of switch nodes in the communication path.

8. The method of claim 7 wherein the step of modifying comprises the step of ascertaining a capability of the first one of the plurality switch nodes to provide the requested communication bandwidth.

9. The method of claim 8 wherein the step of modifying further comprises the step of only providing the ascertained capability of communication bandwidth for the communication path by the first one of the plurality of switch nodes.

10. The method of claim 9 wherein the step of transmitting comprises the step of setting the requested change of the second message equal to the ascertained capability before transmission via the signaling channel by the first one of the plurality of switch nodes.

11. The method of claim 10 wherein the next sequential one of the plurality switch nodes is a destination switch node of the communication path, the each one of the designated communication terminals is connected to the destination switch node, and the destination switch node performs the steps recited the first one of the plurality of switch nodes and transmits second message via the signal channel to the each one of the designated communication terminals rather than the next sequential one of the plurality of switch nodes, and the method further comprises the steps of ascertaining a capability of the one of the designated communication terminals to provide the requested communication bandwidth;

only providing the ascertained communication bandwidth by the one of the designated communication terminals;

forming a third message in response to receipt of the second message by the one of the designated communication terminals;

inserting allocation information into the third message that is equal to the ascertained capability to provided requested communication bandwidth by the one of the designated communication terminals; and transmitting the formed third message back on the signaling channel to the destination switch node by the one of the designated communication terminals.

12. The method of claim 11 further comprises the step of readjusting the communication bandwidth by each of the plurality of switch nodes in the communication path to be equal to that specified by the allocation information in response to receipt of the third message by each of the plurality of switch nodes.

13. A method for establishing a conference call so that the conference call is fully established upon all parties to the conference call being ready to fully participate in the conference call, and the conference call is established on a switching system having a plurality of switch nodes, the method comprising the steps of:

establishing a limited telecommunication bandwidth conference call with a set of the plurality of switch nodes that are each connected to a one of telecommunication terminals designated to participate in the conference call by an initiating one of the plurality switch nodes that interconnects to an initiating telecommunication terminal;

receiving a first message by the initiating one of the plurality of switch nodes from each of the set of the plurality of switch nodes when each of the set of the plurality of switch nodes is ready to fully participate in the conference call; and adjusting the telecommunication bandwidth of the conference call to allow full participation in the conference call by all telecommunication terminals by transmission of a second message to each of the set of the plurality of switch nodes for changing the telecommunication bandwidth by the initiating one of the plurality of switch nodes after all of the set of the plurality of switch nodes have transmitted the first message.

14. The method of claim 13 wherein the first message defines that a one of the designated telecommunication terminals connected to the sending one of the set of the plurality of switch nodes is idle.

15. The method of claim 13 wherein the first message defines that the user of a one of the designated telecommunication terminals connected to the sending one of the set of the plurality of switch nodes is ready to join the conference call.

16. The method of claim 13 wherein the step of adjusting comprises the step of providing voice communication between the telecommunication terminals.

17. The method of claim 13 wherein the step of adjusting comprises the step of providing video and voice communication between the telecommunication terminals.

18. The method of claim 13 wherein the step of adjusting comprises the step of providing data, video and voice communication between the telecommunication terminals.

19. The method of claim 13 wherein the step of adjusting comprises the steps of receiving the second message via a signaling channel that is part of a communication path of the conference call by a first one of the plurality of switch nodes;

determining a requested change in telecommunication bandwidth by the first one of the plurality of switch nodes from the second message;

modifying the communication bandwidth through the first one of the plurality of switch nodes to provide the requested communication by the first one of the plurality of switch nodes bandwidth; and transmitting by a first one of the plurality of switch nodes the second message via the signaling channel to a next sequential one of the plurality of switch nodes.

20. The method of claim 19 wherein the step of modifying comprises the step of ascertaining a capability of the first one of the plurality switch nodes to provide the requested communication bandwidth.

21. The method of claim 20 wherein the step of modifying further comprises the step of only providing the ascertained capability of communication bandwidth by the first one of the plurality of switch nodes.

22. The method of claim 21 wherein the step of transmitting comprises the step of setting the requested change of the second message equal to the ascertained capability before transmission via the signaling channel by the first one of the plurality of switch nodes.

23. The method of claim 22 wherein the next sequential one of the plurality switch nodes is a one of the set of the plurality of switch nodes of the conference call, the method further comprises the steps of ascertaining a capability of the one of the set of the plurality of switch nodes to provide the requested communication bandwidth;

only providing the ascertained communication bandwidth by the one of the set of the plurality of switch nodes;

forming a third message in response to receipt of the second message by the one of the set of the plurality of switch nodes;

inserting allocation information into the third message that is equal to the ascertained capability to provided requested communication bandwidth by the one of the set of the plurality of switch nodes; and transmitting the formed third message back on the signaling channel to the initiating one of the plurality of switch nodes by the one of the set of the plurality of switch nodes.

24. The method of claim 23 further comprises the step of readjusting the communication bandwidth by each of the plurality of switch nodes in the communication path to be equal to that specified by the allocation information in response to receipt of the second message by each of the plurality of switch nodes.

25. A method for initiating a three-way conference call, the method comprising the steps of:

placing a first call with a first telecommunication terminal on hold by a second telecommunication terminal;

setting up a second call to a third telecommunication terminal by the second telecommunication terminal;

reducing communication bandwidth of the second call and establishing a conference call from the first and second calls by the second telecommunication terminal upon the third telecommunication terminal being unable to participate fully in the conference call;

increasing the communication bandwidth to the third telecommunication terminal to allow full participation upon receipt of a first message from the third telecommunication terminal requesting full participation.

26. The method of claim 25 wherein the step of reducing and establishing is in response to the third telecommunication terminal being busy.

27. The method of claim 25 wherein the step of reducing and establishing is in response to a user of the third telecommunication terminal indicating non-participation to the third telecommunication terminal.

28. The method of claim 25 wherein the step of setting up creates a call path between the second telecommunication terminal and the third telecommunication terminal; and the step of reducing and establishing comprises the step of transmitting a second message on the call path by the second telecommunication terminal that reduces the communication bandwidth on the call path.

29. The method of claim 28 wherein the step of increasing comprises transmitting a third message on the call path by the second telecommunication terminal that increases the communication bandwidth on the call path.

30. The method of claim 29 wherein the telecommunication terminals are interconnected by a switching system having a plurality of switch nodes and the call path is through the switching system, and the step of increasing further comprises the step of receiving the third message via a signaling channel that is part of the communication path by a first one of the plurality of switch nodes;

determining a requested change in telecommunication bandwidth by the first one of the plurality of switch nodes from the third message;

modifying the communication bandwidth through the first one of the plurality of switch nodes to provide the requested communication bandwidth; and transmitting by a first one of the plurality of switch nodes the third message via the signaling channel to a next sequential one of the plurality of switch nodes in the communication path.

31. The method of claim 30 wherein the step of modifying comprises the step of ascertaining a capability of the first one of the plurality switch nodes to provide the requested communication bandwidth.

32. The method of claim 31 wherein the step of modifying further comprises the step of only providing the ascertained capability of communication bandwidth for the communication path by the first one of the plurality of switch nodes.

33. The method of claim 32 wherein the step of transmitting comprises the step of setting the requested change of the third message equal to the ascertained capability before transmission via the signaling channel by the first one of the plurality of switch nodes.

34. The method of claim 33 wherein the next sequential one of the plurality switch nodes is a destination switch node of the communication path, the third communication terminal is connected to the destination switch node, and the destination switch node performs the steps recited for the first one of the plurality of switch nodes and transmits the third message via the signal channel to the third communication terminal rather than the next sequential one of the plurality of switch nodes, and the method further comprises the steps of ascertaining a capability of the third communication terminal to provide the requested communication bandwidth;

only providing the ascertained communication bandwidth by the third communication terminal;

forming a fourth message in response to receipt of the third message by third communication terminal;

inserting allocation information into the fourth message that is equal to the ascertained capability to provided requested communication bandwidth by the third communication terminal; and transmitting the formed fourth message back on the signaling channel to the destination switch node by the third communication terminal.

35. The method of claim 34 further comprises the step of readjusting the communication bandwidth by each of the plurality of switch nodes in the communication path to be equal to that specified by the allocation information in response to receipt of the fourth message by each of the plurality of switch nodes.

36. A method for initiating a three-way conference call and the conference call is established on a switching system having a plurality of switch nodes, the method comprising the steps of:

placing a first call between a first telecommunication terminal and a second telecommunication terminal on hold by an initiating one of the plurality of switch nodes to which the second telecommunication terminal is connected;

setting up a second call to a destination one of the plurality of switch nodes connected to a third telecommunication terminal by the initiating one of the plurality of switch nodes;

reducing communication bandwidth of the second call and establishing a conference call from the first and second calls by the initiating one of the plurality of switch nodes upon the third telecommunication terminal being unable to participate fully in the conference call;

increasing the communication bandwidth to the destination one of the plurality of switch nodes to allow full participation upon receipt of a first message from the destination one of the plurality of switch nodes that the third telecommunication terminal is requesting full participation.

37. The method of claim 36 wherein the step of reducing and establishing is in response to the third telecommunication terminal being busy.

38. The method of claim 36 wherein the step of reducing and establishing is in response to a user of the third telecommunication terminal indicating non- participation to the third telecommunication terminal.

39. The method of claim 36 wherein the step of setting up creates a call path between the initiating one of the plurality of switch nodes and the destination one of the plurality of switch nodes; and the step of reducing and establishing comprises the step of transmitting a second message on the call path by the initiating one of the plurality of switch nodes that reduces the communication bandwidth on the call path.

40. The method of claim 39 wherein the step of increasing comprises transmitting a third message on the call path by the initiating one of the plurality of switch nodes that increases the communication bandwidth on the call path.

41. The method of claim 40 wherein the step of increasing further comprises the step of receiving the third message via a signaling channel that is part of the communication path by a first one of the plurality of switch nodes;

determining a requested change in telecommunication bandwidth by the first one of the plurality of switch nodes from the third message;

modifying the communication bandwidth through the first one of the plurality of switch nodes to provide the requested communication bandwidth; and transmitting by a first one of the plurality of switch nodes the third message via the signaling channel to a next sequential one of the plurality of switch nodes in the communication path.

42. The method of claim 41 wherein the step of modifying comprises the step of ascertaining a capability of the first one of the plurality switch nodes to provide the requested communication bandwidth.

43. The method of claim 42 wherein the step of modifying further comprises the step of only providing the ascertained capability of communication bandwidth for the communication path by the first one of the plurality of switch nodes.

44. The method of claim 43 wherein the step of transmitting comprises the step of setting the requested change of the third message equal to the ascertained capability before transmission via the signaling channel by the first one of the plurality of switch nodes.

45. The method of claim 44 wherein the next sequential one of the plurality switch nodes is the destination one of the plurality of switch nodes of the call path, and the method further comprises the steps of ascertaining a capability of the destination one of the plurality of switch nodes to provide the requested communication bandwidth;

only providing the ascertained communication bandwidth by the destination one of the plurality of switch nodes;

forming a fourth message in response to receipt of the third message by the destination one of the plurality of switch nodes;

inserting allocation information into the fourth message that is equal to the ascertained capability to provided requested communication bandwidth by the destination one of the plurality of switch nodes; and transmitting the formed fourth message back on the signaling channel to the initiating one of the plurality of switch nodes by the destination one of the plurality of switch nodes.

46. The method of claim 45 further comprises the step of readjusting the communication bandwidth by each of the plurality of switch nodes in the communication path to be equal to that specified by the allocation information in response to receipt of the fourth message by each of the plurality of switch nodes.

47. An apparatus for establishing a conference call so that the conference call is fully established upon all parties to the conference call being ready to fully participate in the conference call, comprising:

means in an initiating telecommunication terminal for establishing a limited telecommunication bandwidth conference call to all designated telecommunication terminals;

means in the initiating telecommunication terminal for receiving a first message from each of the designated telecommunication terminals when each of the designated telecommunication terminals is ready to fully participate in the conference call; and means in the initiating telecommunication terminal for adjusting the telecommunication bandwidth of the conference call to allow full participation in the conference call by all telecommunication terminals by transmission of a second message to each of the designated telecommunication terminals for changing the telecommunication bandwidth after all of the designated telecommunication terminals have transmitted the first message.

48. The apparatus of claim 47 wherein the first message defines that the sending telecommunication terminal is idle.

49. The apparatus of claim 47 wherein the first message defines that the user of the sending telecommunication terminal is ready to join the conference call.

50. The apparatus of claim 47 wherein the means for adjusting comprises means for providing voice communication between the telecommunication terminals.

51. The apparatus of claim 47 wherein the means for adjusting comprises means for providing video and voice communication between the telecommunication terminals.

52. The apparatus of claim 47 wherein the means for adjusting comprises means for providing data, video and voice communication between the telecommunication terminals.

53. The apparatus of claim 47 wherein the conference call is established on communication paths through a switching system with each communication path connecting one of the designated telecommunication terminals to the initiating telecommunication terminal, and the switching system having a plurality of switch nodes and the means for adjusting comprises, for each communication path, means in a first one of the plurality of switch nodes for receiving the second message via a signaling channel that is part of the communication path;

means in the first one of the plurality of switch nodes from the second message for determining a requested change in telecommunication bandwidth;

means in the first one of the plurality of switch nodes for modifying the communication bandwidth through the first one of the plurality of switch nodes to provide the requested communication bandwidth; and means in the first one of the plurality of switch nodes for transmitting the second message via the signaling channel to a next sequential one of the plurality of switch nodes in the communication path.

54. The apparatus of claim 53 wherein the means for modifying comprises means for ascertaining a capability of the first one of the plurality switch nodes to provide the requested communication bandwidth.

55. The apparatus of claim 54 wherein the means for modifying further comprises means in the first one of the plurality of switch nodes for only providing the ascertained capability of communication bandwidth for the communication path.

56. The apparatus of claim 55 wherein the means for transmitting comprises means in the first one of the plurality of switch nodes for setting the requested change of the second message equal to the ascertained capability before transmission via the signaling channel.

57. The apparatus of claim 56 wherein the next sequential one of the plurality switch nodes is a destination switch node of the communication path, the each one of the designated communication terminals is connected to the destination switch node, and the destination switch node performs the functions recited for the first one of the plurality of switch nodes and transmits second message via the signal channel to the each one of the designated communication terminals rather than the next sequential one of the plurality of switch nodes, and the apparatus further comprises means in the one of the designated communication terminals for ascertaining a capability of the one of the designated communication terminals to provide the requested communication bandwidth;

means in the one of the designated communication terminals for only providing the ascertained communication bandwidth;

means in the one of the designated communication terminals for forming a third message in response to receipt of the second message;

means in the one of the designated communication terminals for inserting allocation information into the third message that is equal to the ascertained capability to provided requested communication bandwidth; and means in the one of the designated communication terminals for transmitting the formed third message back on the signaling channel to the destination switch node.

58. The apparatus of claim 57 further comprises means in each of the plurality of switch nodes for readjusting the communication bandwidth in the communication path to be equal to that specified by the allocation information in response to receipt of the third message in each of the plurality of switch nodes.

59. An apparatus for establishing a conference call so that the conference call is fully established upon all parties to the conference call being ready to fully participate in the conference call, and the conference call is established on a switching system having a plurality of switch nodes, comprising:

means in an initiating one of the plurality switch nodes for establishing a limited telecommunication bandwidth conference call with a set of the plurality of switch nodes that are each connected to a one of telecommunication terminals designated to participate in the conference call that interconnects to the initiating telecommunication terminal;

means in the initiating one of the plurality of switch nodes for receiving a first message from each of the set of the plurality of switch nodes when each of the set of the plurality of switch nodes is ready to fully participate in the conference call; and means in the initiating one of the plurality of switch nodes for adjusting the telecommunication bandwidth of the conference call to allow full participation in the conference call by all telecommunication terminals by transmission of a second message to each of the set of the plurality of switch nodes for changing the telecommunication bandwidth after all of the set of the plurality of switch nodes have transmitted the first message.

60. The apparatus of claim 59 wherein the first message defines that a one of the designated telecommunication terminals connected to the sending one of the set of the plurality of switch nodes is idle.

61. The apparatus of claim 59 wherein the first message defines that the user of a one of the designated telecommunication terminals connected to the sending one of the set of the plurality of switch nodes is ready to join the conference call.

62. The apparatus of claim 59 wherein the means for adjusting comprises means for providing voice communication between the telecommunication terminals.

63. The apparatus of claim 59 wherein the means for adjusting comprises means for providing video and voice communication between the telecommunication terminals.

64. The apparatus of claim 59 wherein the means for adjusting comprises means for providing data, video and voice communication between the telecommunication terminals.

65. The apparatus of claim 59 wherein the means for adjusting comprises means in a first one of the plurality of switch nodes for receiving the second message via a signaling channel that is part of a communication path of the conference call;

means in the first one of the plurality of switch nodes for determining a requested change in telecommunication bandwidth from the second message;

means in the first one of the plurality of switch nodes for modifying the communication bandwidth through the switch node to provide the requested communication bandwidth; and means in the first one of the plurality of switch nodes for transmitting the second message via the signaling channel to a next sequential one of the plurality of switch nodes.

66. The apparatus of claim 65 wherein the means for modifying comprises means for ascertaining a capability of the first one of the plurality switch nodes to provide the requested communication bandwidth.

67. The apparatus of claim 66 wherein the means for modifying further comprises means for only providing the ascertained capability of communication bandwidth in the first one of the plurality of switch nodes.

68. The apparatus of claim 67 wherein the means for transmitting comprises means in the first one of the plurality of switch nodes for setting the requested change of the second message equal to the ascertained capability before transmission via the signaling channel.

69. The apparatus of claim 68 wherein the next sequential one of the plurality switch nodes is a one of the set of the plurality of switch nodes of the conference call, the apparatus further comprises means in the one of the set of the plurality of switch nodes for ascertaining a capability of the one of the set of the plurality of switch nodes to provide the requested communication bandwidth;

means in the one of the set of the plurality of switch nodes for only providing the ascertained communication bandwidth;

means in the one of the set of the plurality of switch nodes for forming a third message in response to receipt of the second message;

means in the one of the set of the plurality of switch nodes for inserting allocation information into the third message that is equal to the ascertained capability to provided requested communication bandwidth; and means in the one of the set of the plurality of switch nodes for transmitting the formed third message back on the signaling channel to the initiating one of the plurality of switch nodes.

70. The apparatus of claim 69 further comprises means in each of the plurality of switch nodes for readjusting the communication bandwidth in the communication path to be equal to that specified by the allocation information in response to receipt of the second message by each of the plurality of switch nodes.

71. An apparatus for initiating a three-way conference call, comprising:

means in a second telecommunication terminal for placing a first call with a first telecommunication terminal on hold;

means in the second telecommunication terminal for setting up a second call to a third telecommunication terminal;

means in the second telecommunication terminal for reducing communication bandwidth of the second call and establishing a conference call from the first and second calls upon the third telecommunication terminal being unable to participate fully in the conference call;

means in the second telecommunication terminal for increasing the communication bandwidth to the third telecommunication terminal to allow full participation upon receipt of a first message from the third telecommunication terminal requesting full participation.

72. The apparatus of claim 71 wherein the means for reducing and establishing is in response to the third telecommunication terminal being busy.

73. The apparatus of claim 71 wherein the means for reducing and establishing is in response to a user of the third telecommunication terminal indicating non-participation to the third telecommunication terminal.

74. The apparatus of claim 71 wherein the means for setting up creates a call path between the second telecommunication terminal and the third telecommunication terminal; and the means for reducing and establishing comprises means in the second telecommunication terminal for transmitting a second message on the call path that reduces the communication bandwidth on the call path.

75. The apparatus of claim 74 wherein the means for increasing comprises means in the second telecommunication terminal for transmitting a third message on the call path that increases the communication bandwidth on the call path.

76. The apparatus of claim 75 wherein the telecommunication terminals are interconnected by a switching system having a plurality of switch nodes and the call path is through the switching system, and the means for increasing further comprises means in a first one of the plurality of switch nodes for receiving the third message via a signaling channel that is part of the communication path;

means in a first one of the plurality of switch nodes for determining a requested change in telecommunication bandwidth from the third message;

means in a first one of the plurality of switch nodes for modifying the communication bandwidth through the first one of the plurality of switch nodes to provide the requested communication bandwidth; and means in a first one of the plurality of switch nodes for transmitting the third message via the signaling channel to a next sequential one of the plurality of switch nodes in the communication path.

77. The apparatus of claim 76 wherein the means for modifying comprises means for ascertaining a capability of the first one of the plurality switch nodes to provide the requested communication bandwidth.

78. The apparatus of claim 77 wherein the means for modifying further comprises means in the first one of the plurality of switch nodes for only providing the ascertained capability of communication bandwidth for the communication path.

79. The apparatus of claim 78 wherein the means for transmitting comprises means in the first one of the plurality of switch nodes for setting the requested change of the third message equal to the ascertained capability before transmission via the signaling channel.

80. The apparatus of claim 79 wherein the next sequential one of the plurality switch nodes is a destination switch node of the communication path, the third communication terminal is connected to the destination switch node, and the destination switch node performs the functions recited for the first one of the plurality of switch nodes and transmits the third message via the signal channel to the third communication terminal rather than the next sequential one of the plurality of switch nodes, and the apparatus further comprises means in the third communication terminal for ascertaining a capability of the third communication terminal to provide the requested communication bandwidth;

means in the third communication terminal for only providing the ascertained communication bandwidth in the third communication terminal;

means in the third communication terminal for forming a fourth message in response to receipt of the third message;

means in third communication terminal for inserting allocation information into the fourth message that is equal to the ascertained capability to provided requested communication bandwidth; and means in the third communication terminal for transmitting the formed fourth message back on the signaling channel to the destination switch node.

81. The apparatus of claim 80 further means in each of the plurality of switch nodes for readjusting the communication bandwidth in the communication path to be equal to that specified by the allocation information in response to receipt of the fourth message by each of the plurality of switch nodes.

82. An apparatus for initiating a three-way conference call and the conference call is established on a switching system having a plurality of switch nodes, comprising:

means in an initiating one of the plurality of switch nodes to which a second telecommunication terminal is connected for placing a first call between a first telecommunication terminal and the second telecommunication terminal on hold;

means for setting up a second call to a destination one of the plurality of switch nodes connected to a third telecommunication terminal;

means in an initiating one of the plurality of switch nodes for reducing communication bandwidth of the second call and establishing a conference call from the first and second calls upon the third telecommunication terminal being unable to participate fully in the conference call;

means in an initiating one of the plurality of switch nodes for increasing the communication bandwidth to the destination one of the plurality of switch nodes to allow full participation upon receipt of a first message from the destination one of the plurality of switch nodes that the third telecommunication terminal is requesting full participation.

83. The apparatus of claim 82 wherein the means for reducing and establishing is in response to the third telecommunication terminal being busy.

84. The apparatus of claim 82 wherein the means for reducing and establishing is in response to a user of the third telecommunication terminal indicating non-participation to the third telecommunication terminal.

85. The apparatus of claim 82 wherein the means for setting up creates a call path between the initiating one of the plurality of switch nodes and the destination one of the plurality of switch nodes; and the means for reducing and establishing comprises means in the initiating one of the plurality of switch nodes for transmitting a second message on the call path that reduces the communication bandwidth on the call path.

86. The apparatus of claim 85 wherein the means for increasing comprises means in the initiating one of the plurality of switch nodes for transmitting a third message on the call path that increases the communication bandwidth on the call path.

87. The apparatus of claim 86 wherein the means for increasing further comprises means in a first one of the plurality of switch nodes for receiving the third message via a signaling channel that is part of the communication path;

means in a first one of the plurality of switch nodes for determining a requested change in telecommunication bandwidth from the third message;

means in a first one of the plurality of switch nodes for modifying the communication bandwidth through the first one of the plurality of switch nodes to provide the requested communication bandwidth; and means in a first one of the plurality of switch nodes for transmitting the third message via the signaling channel to a next sequential one of the plurality of switch nodes in the communication path.

88. The apparatus of claim 87 wherein the means for modifying comprises means for ascertaining a capability of the first one of the plurality switch nodes to provide the requested communication bandwidth.

89. The apparatus of claim 88 wherein the means for modifying further comprises means for only providing the ascertained capability of communication bandwidth for the communication path.

90. The apparatus of claim 89 wherein the means for transmitting comprises means for setting the requested change of the third message equal to the ascertained capability before transmission via the signaling channel.

91. The apparatus of claim 90 wherein the next sequential one of the plurality switch nodes is the destination one of the plurality of switch nodes of the call path, and the apparatus further comprises means in the destination one of the plurality of switch nodes for ascertaining a capability of the destination one of the plurality of switch nodes to provide the requested communication bandwidth;

means in the destination one of the plurality of switch nodes for only providing the ascertained communication bandwidth;

means in the destination one of the plurality of switch nodes for forming a fourth message in response to receipt of the third message;

means in the destination one of the plurality of switch nodes for inserting allocation information into the fourth message that is equal to the ascertained capability to provided requested communication bandwidth; and means in the destination one of the plurality of switch nodes for transmitting the formed fourth message back on the signaling channel to the initiating one of the plurality of switch nodes.

92. The apparatus of claim 91 further comprises means in each of the plurality of switch nodes for readjusting the communication bandwidth in the communication path to be equal to that specified by the allocation information in response to receipt of the fourth message by each of the plurality of switch nodes.

* * * * *